United States Patent
Widder et al.

(10) Patent No.: US 9,126,770 B1
(45) Date of Patent: Sep. 8, 2015

(54) ALIGNING AND STACKING PALLETIZING MACHINE

(71) Applicant: Automatan, Inc., Plover, WI (US)

(72) Inventors: Kevin Widder, Sheboygan, WI (US); Travis Przybylski, Mosinee, WI (US)

(73) Assignee: Automatan, Inc., Plover, WI (US)

( * ) Notice: Subject to any disclaimer, the term of this patent is extended or adjusted under 35 U.S.C. 154(b) by 214 days.

(21) Appl. No.: 13/760,878

(22) Filed: Feb. 6, 2013

Related U.S. Application Data

(60) Provisional application No. 61/596,850, filed on Feb. 9, 2012.

(51) Int. Cl.
*B65G 57/02* (2006.01)
*B25J 18/00* (2006.01)

(52) U.S. Cl.
CPC ............. *B65G 57/02* (2013.01); *B25J 18/00* (2013.01); *Y10S 901/27* (2013.01)

(58) Field of Classification Search
CPC ...... B65G 57/02; B65G 57/03; B65G 57/035; B65G 57/20; B65G 57/005; B65G 57/245; B65G 61/00; B65G 47/086; B65G 35/20; B65G 35/205
USPC ............ 414/792.7, 794.4, 794.6, 794.7, 799; 901/31, 39
See application file for complete search history.

(56) References Cited

U.S. PATENT DOCUMENTS

| | | | |
|---|---|---|---|
| 3,586,176 A | 6/1971 | Rackman et al. | |
| 4,055,261 A | 10/1977 | Schneider | |
| 4,242,025 A | 12/1980 | Thibault | |
| 4,545,715 A | 10/1985 | Seefeldt | |
| 4,746,255 A | 5/1988 | Roccabianca et al. | |
| 5,040,942 A | 8/1991 | Brinker et al. | |
| 5,139,388 A * | 8/1992 | Martin | 414/799 |
| 5,141,274 A | 8/1992 | Hayden et al. | |
| 5,338,150 A | 8/1994 | Focke et al. | |
| 5,730,579 A | 3/1998 | Keck et al. | |
| 6,059,519 A * | 5/2000 | Dutto et al. | 414/791.6 |
| 6,658,816 B1 * | 12/2003 | Parker et al. | 53/397 |
| 7,802,959 B2 | 9/2010 | Pierson et al. | |
| 7,850,415 B2 | 12/2010 | Blanc | |
| 8,074,431 B1 * | 12/2011 | Pierson et al. | 53/529 |
| 2008/0298949 A1 | 12/2008 | Van Heijningen | |
| 2009/0000415 A1 * | 1/2009 | Parker | 74/490.01 |
| 2009/0010749 A1 * | 1/2009 | Germain | 414/801 |
| 2010/0068027 A1 | 3/2010 | Mitchell | |

* cited by examiner

*Primary Examiner* — Saul Rodriguez
*Assistant Examiner* — Lynn Schwenning
(74) *Attorney, Agent, or Firm* — Boyle Fredrickson, S.C.

(57) ABSTRACT

A device for engaging and aligning items moving along a conveyance line that are to be positioned on a pallet is provided. The device includes a robotic arm positioned adjacent the conveyance line and having a manipulator thereon. The manipulator includes a number of fingers that extend downwardly from the manipulator in order to engage the items on the conveyance line. The fingers operate to stop and align the items to form a well-defined stack in the shape defined by the position of the fingers on the manipulator. The manipulator can rotate while the fingers are in engagement with the stack of items in order to reposition the items as desired for placement on the pallet by sliding the items along the various surfaces of the system and without lifting the items off of the conveyance line, thereby limiting the cost and time associated with the operation of the device.

16 Claims, 24 Drawing Sheets

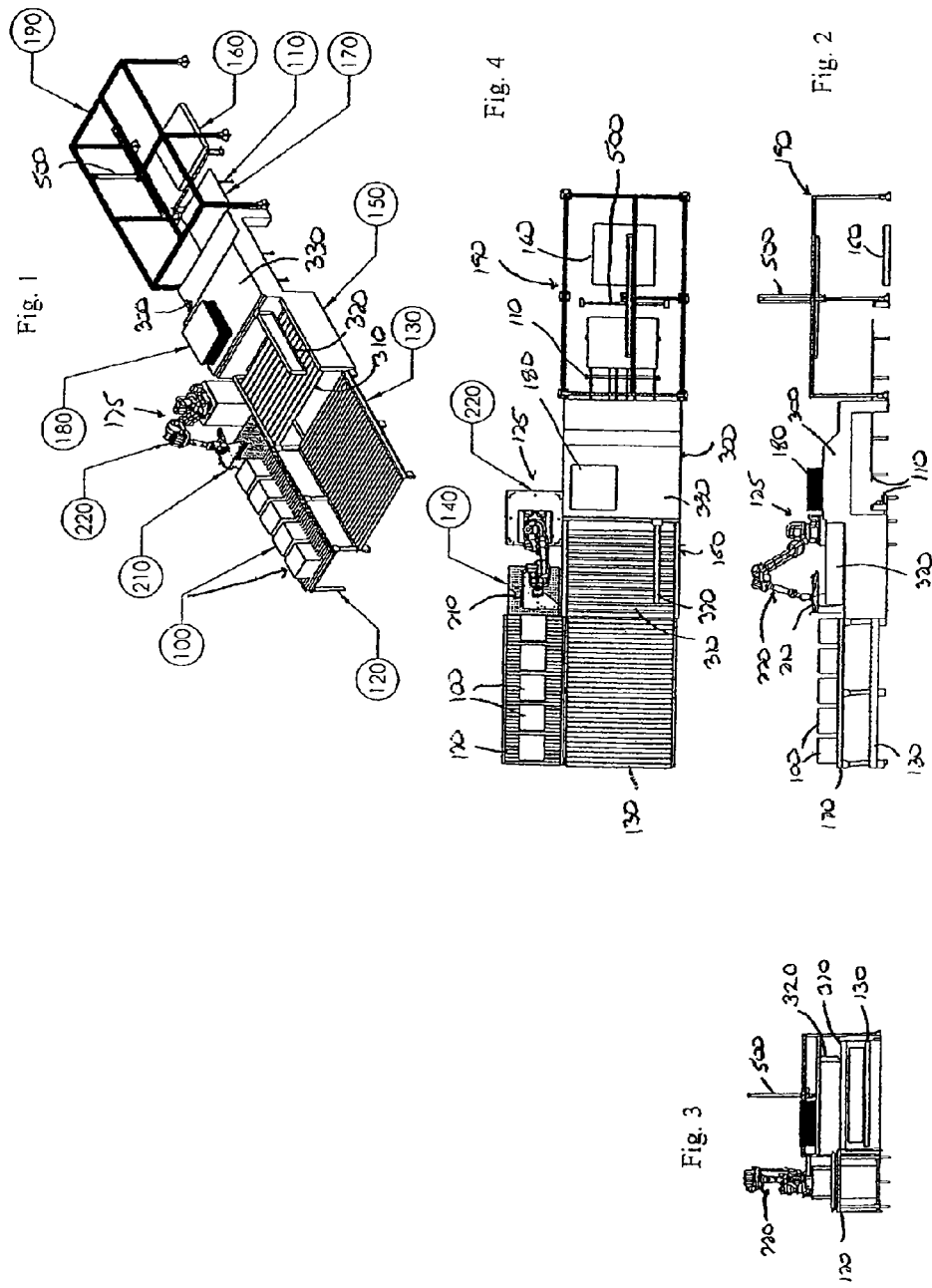

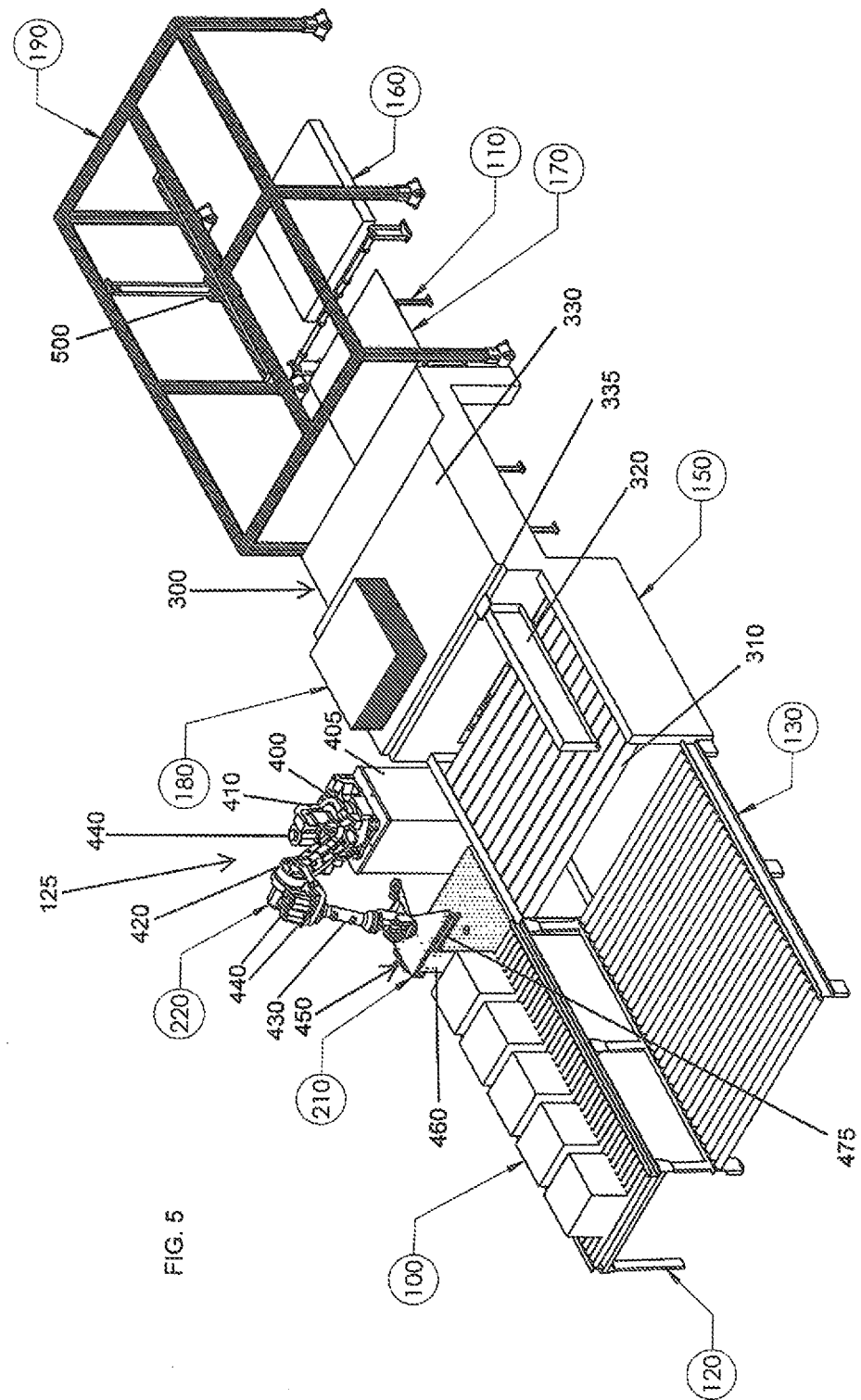

ALIGNING AND STACKING PALLETIZING MACHINE

CROSS-REFERENCE TO RELATED APPLICATIONS

This application claims priority from U.S. Provisional Application Ser. No. 61/596,850, filed on Feb. 9, 2012, the entirety of which is expressly incorporated herein by reference.

FIELD OF THE INVENTION

The present invention relates generally mechanisms for positioning and stacking goods, items or packages for shipment, and more particularly to a device, mechanism or machine that operates to receive a number of different types and sizes of items in order to reposition and place the items in layers on a pallet.

BACKGROUND OF THE INVENTION

There are many types of machines that have been used for the purpose of re-orienting placing goods in the proper location for the shipment of the goods, such as in layers on a pallet. In these configurations, the goods can be readily prepared for shipment in a conventional manner.

However, due to the variety of configurations of the goods and packaging for the goods to be positioned on the pallets for shipment, one significant issue in performing this function is properly aligning the goods/packages in the appropriate layers in order to effectively form the pallet. A number of other considerations, such as the weight of the goods in the packages, the number of packages to be placed on the pallet, etc., are also taken into account when determining where and in what arrangement to properly locate the packages in the pallet.

With prior art machines of this type, the primary function of the machine is to determine the type of good/package, to orient the good/package in the proper manner, and the move the good/package into the proper position on the pallet. When a completed layer of the goods/packages is completed on the pallet, the machine can further lower the pallet in order to position the pallet in a position where it can accept another layer of the goods/packages thereon, or, if full, the pallet can be moved from the machine for further processing prior to shipment, with an empty pallet being substituted in its place to receive additional goods/packages.

The goods/packages are moved towards the machine in any conventional manner, such as on a conveyor belt, to maintain the flow of the goods/packages as desired. Upon reaching the machine, the goods/packages are positioned in the desired configuration by the machine in order to enable the goods/packages to be ready for placement on the pallet.

In prior art machines that perform this function, the orientation of the goods/packages is accomplished by a variety of devices placed in the path of the packages as they move to a palletizing station of the machine. One example of these types of devices is formed as a conveyor having shiftable barrier components thereon which can be moved into various positions over the conveyor belt to deflect the incoming packages into a desired position in conjunction with the side rails positioned on either side of the conveyor.

Other devices include frames having one or movable portions on which is disposed a head having a number of suction or other grippers attached to the head. The grippers operate to grab each package and lift and rotate the package into the desired position. Once in that position, the head is moved over the pallet and subsequently lowered to position the package where desired on the pallet.

While these devices are capable of moving packages into desired positions to form layers of the packages or items in forming pallets of the items for shipment, the devices require many separate structural items separate from the actual items or package conveyance line, which greatly increases the complexity and cost of the devices.

In addition, while the movable barrier components or grippers can effectively move most of the types of items which are being stacked on a pallet, the weight of the items can create issues with each of these types of device. For items that are relatively lightweight, they can bounce off of the movable barriers into orientations that cannot be readily stacked. Conversely, for items that a relatively heavy, the suction or gripper head cannot effectively lift the heavy item into the proper orientation and location.

Further, most of the prior art devices are constructed and operate in a manner that when the device is inoperable for some reason, the conveyance line for palletizing the items or packages cannot be run until the device is made operable once again. Further, the prior art devices do not include structures that are readily capable of engaging and straightening or aligning a stack of sheets with one another as that stack is also moved by the device into the desired position.

Thus, it is desirable to develop a device that can operate to position items and packages, such as boxes or stacks of sheets of material, for example, in a desired position in a number of layers to form a pallet that can rotate the items into the desired position for forming a layer on a pallet. It is also desirable to develop a device that can accomplish this function with existing conveyance lines but without impairing the operation of the line when the device is not operating. It is still also desirable to develop a device that is able to align and reposition the items without having the weight of the items affect the operation of the device or the need for lifting the items above the surface of the conveyance line.

SUMMARY OF THE INVENTION

Briefly described, one aspect of the present disclosure provides a device for engaging and aligning items moving along a conveyance line that are to be positioned on a pallet. The device includes a robotic arm positioned adjacent the conveyance line and having a head, manipulator or gripper thereon. The manipulator includes a number of fingers that extend downwardly from the head in order to engage the items on the conveyance line. The fingers operate to stop and align the items to form a well-defined stack in the shape defined by the position of the fingers on the manipulator.

According to another aspect of the present disclosure, the manipulator can also rotate while the fingers are in engagement with the items in order to reposition the items as desired. This is done by sliding the items along the various surfaces of the system and without lifting the items off of the conveyance line, thereby limiting the cost and time associated with the operation of the device.

According to still another aspect of the present disclosure, the robotic arm and manipulator form a self contained unit that can be positioned immediately adjacent one side of an existing conveyance line to be utilized with the line. In this configuration, when the arm is inoperable for any reason, the arm can be manually repositioned away from the conveyor such that the conveyance line can still be operated manually without interference from the robotic arm and manipulator.

Numerous other aspects, features, and advantages of the present disclosure will be made apparent from the following detailed description together with the drawings figures.

BRIEF DESCRIPTION OF THE DRAWINGS

The drawings illustrate the best mode currently contemplated of practicing the present invention.

In the drawings:

FIG. 1 is an isometric view of a one embodiment of a device constructed according to the present disclosure;

FIG. 2 is a left side elevation view of the device of FIG. 1;

FIG. 3 is a front elevation view of the device of FIG. 1;

FIG. 4 is a top plan view of the device of FIG. 1;

FIG. 5 is an isometric view of the device of FIG. 1 in a start position;

DETAILED DESCRIPTION OF THE INVENTION

Figure 6:
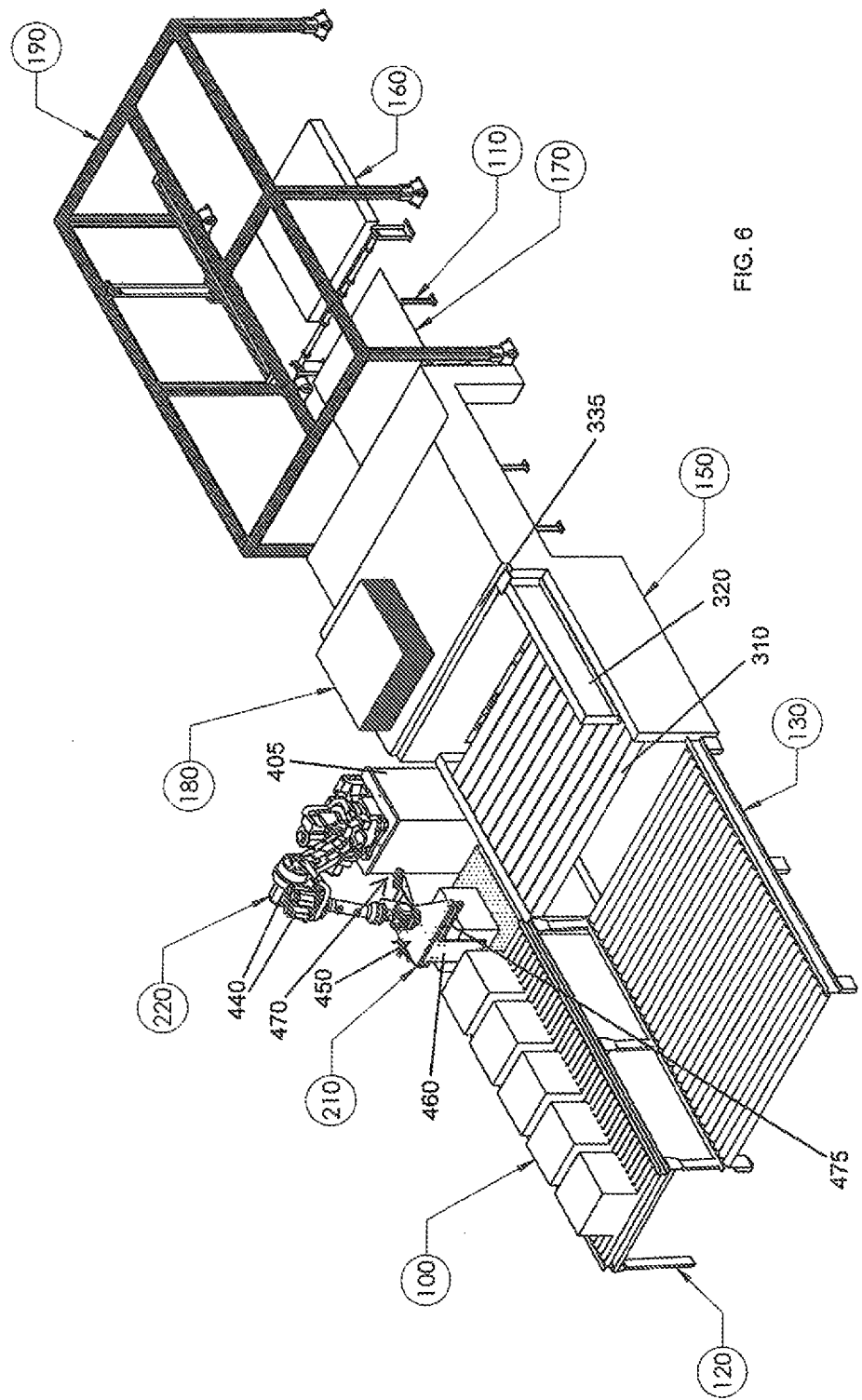
FIG. 6 is an isometric view of the device of FIG. 1 initially engaging an item.

Referring now in detail to the drawing figures, wherein like reference numerals represent like parts throughout the several views, a palletizing system 10 includes an incoming feed conveyor, illustrated generally at 120 in FIG. 1. As best shown in FIGS. 1-4, the feed conveyor 120 is constructed in any suitable manner and operates to move stacks or bundles of items 100 towards a palletizing station 125. The palletizing station 125 includes a loading conveyor 150 disposed immediately adjacent the feed conveyor 120 and an outfeed conveyor 130 extending away from the station 125. In the palletizing station 125, items 100 being palletized are positioned in a manner that enables the items 100 to form a layer 200 on a pallet, dunnage sheet, or similar member 170 that is arranged in conjunction with a number of additional layers 202 on the pallet 170. The pallet 170 is supplied to the loading conveyor 150 of the palletizing section 125 from a supply stack 160 by a feeder system 190 that is disposed adjacent the section 125, and in the illustrated embodiment, that is disposed generally opposite the outfeed conveyor 130.

The loading conveyor 150 is formed with a frame 300 that supports a vertically movable conveyor section 310 therein. The range of motion of the conveyor section 310 extends from an upper position where the conveyor section 310 is aligned with the feed conveyor 120 to a lower position where the conveyor section 310 is aligned with the outfeed conveyor 130.

In the lower position, the conveyor section 310 is also aligned with the feeder system 190, such that replacement pallets 170 can be discharged onto the conveyor section 310 from the discharge conveyor and roller 110 of the feeder system 190 that is positioned beneath the frame 300. The pallets 170 are placed on the conveyor 110 by a suitable mechanism 500 utilized by the system 190.

The loading conveyor 150 additionally includes a movable barrier 320 secured to the frame 300. The barrier 320 is slidably and optionally pivotally movable over the conveyor section 310 along a track 335 formed on the upper end of the frame 300 in order to enable the barrier 320 to form a back stop for the items 100 being positioned on the pallet 170.

The frame 300 of the loading conveyor 150 also includes an upper surface 330 on which is disposed a supply of tie sheets 180. When a layer 200 of items 100 has been formed on the pallet 170, a tie sheet 180 can be moved from the upper surface 330 onto the top of the layer 200. Additional items 100 can subsequently be positioned on the tie sheet 180 to form another layer 202 of items 100 on the pallet 170.

Disposed adjacent the feed conveyor 120 and the loading conveyor 150 is disposed a riser 405 secured to the floor on which the system 10 is supported by a number of suitable fasteners (not shown). The riser 405 houses a power source (not shown) for a robotic arm 220 disposed on the top of the riser 405. The arm 220 includes a base 400 secured to the riser 405, a lower portion 410 rotatably secured to the base 400, a central portion 420 rotatably connected to the lower portion 410 opposite the base 400, and a distal portion 430 rotatably connected to the central portion 420 opposite the lower portion 410. Each portion 410, 420 and 430 is controlled by suitable motors 440 operably connected to the respective portions 410, 420 and 430. The motors 440 can be any suitable type of motor, such as a computer-programmable and controllable servo motor, that enables the arm 220 to be precisely moved relative to the items 100 and the other components of the system 10. In addition, connections between the various portions 400, 410, 420 and 430 of the arm 220 enable the portions 400, 410, 420 and 430 to rotate with respect to one another through at least one hundred and eighty degrees)(180°) of motion, and more preferably at least two hundred and seventy degrees)(270°) of motion, and most preferably up to three hundred and sixty degrees (360°) of motion. In this manner, the arm 220 can be operated to align and move items 100 having virtually any configuration from the feed conveyor 120 onto the loading conveyor 150 to form layers on the pallet 170 in any desired shape.

The end of the distal portion 430 opposite the central portion 420 includes a manipulator 210. The manipulator 210 includes a body 450 shaped to be complementary to the items 100 being stacked on the pallet 170. While the body 450 can have any desired shape, in the illustrated embodiment, the body 450 has a generally triangular shape in order to conform to the shape of the items 100 engaged by the manipulator 210. The body 450 is operably connected to the distal portion 430 of the arm 220 to be rotatable thereto. A motor 440 operably connected to the body 450 enables the body to rotate a full three hundred and sixty degrees (360°) relative to the distal portion 430.

Depending from the body 450 are a number of fingers 460 secured at one end to the body 450. The fingers 460 are shaped as a desired and formed from any suitable material and to be able to engage the items 100 coming along the feed conveyor 120, and to align the items 100 on the conveyor 120, thereby ensuring that the item 100 is in proper position for placement on the pallet 170. To assist in performing this function, the fingers 460 can be formed of a generally rigid material, such as a hard plastic, that allows for some flexibility of the fingers 460, but that also contacts the items 100 with sufficient force to align the items 100 as desired. Further, while a pair of fingers 460 are shown extending outwardly from the body 450 in the illustrated embodiment, any number, including one or more fingers 460, or configuration of fingers 460 can be attached to the body 450 to provide the desired function. Also, the body 450 can include slots 475 thereon to enable the fingers 460 to be adjustably mounted to the body 450 where desired, or to enable different configurations for the fingers 460 on the body 450.

The fingers 460 are formed in the illustrated embodiment to exclusively frictionally engage the items 100, without any additional engagement means, such as suction means. Additionally, the fingers 460 in the illustrated embodiment engage only the sides of the items 100, with no engagement of the fingers 460 with the top or bottom surfaces of the items 100, such that the fingers 460 do not provide any lifting forces on the items 100. Further, in the illustrated embodiment, the fingers 460 have a length sufficient to position the body 450 above the top surface of the items 100 when the fingers 460 are engaged with the items 100. The fingers 460 can contact the feed conveyor 120 to ensure contact with the entirety of the item 100, while keeping the body 450 from contacting the item 100 and potentially shifting the item 120 partially or totally out of engagement with the fingers 460.

Figure 7:
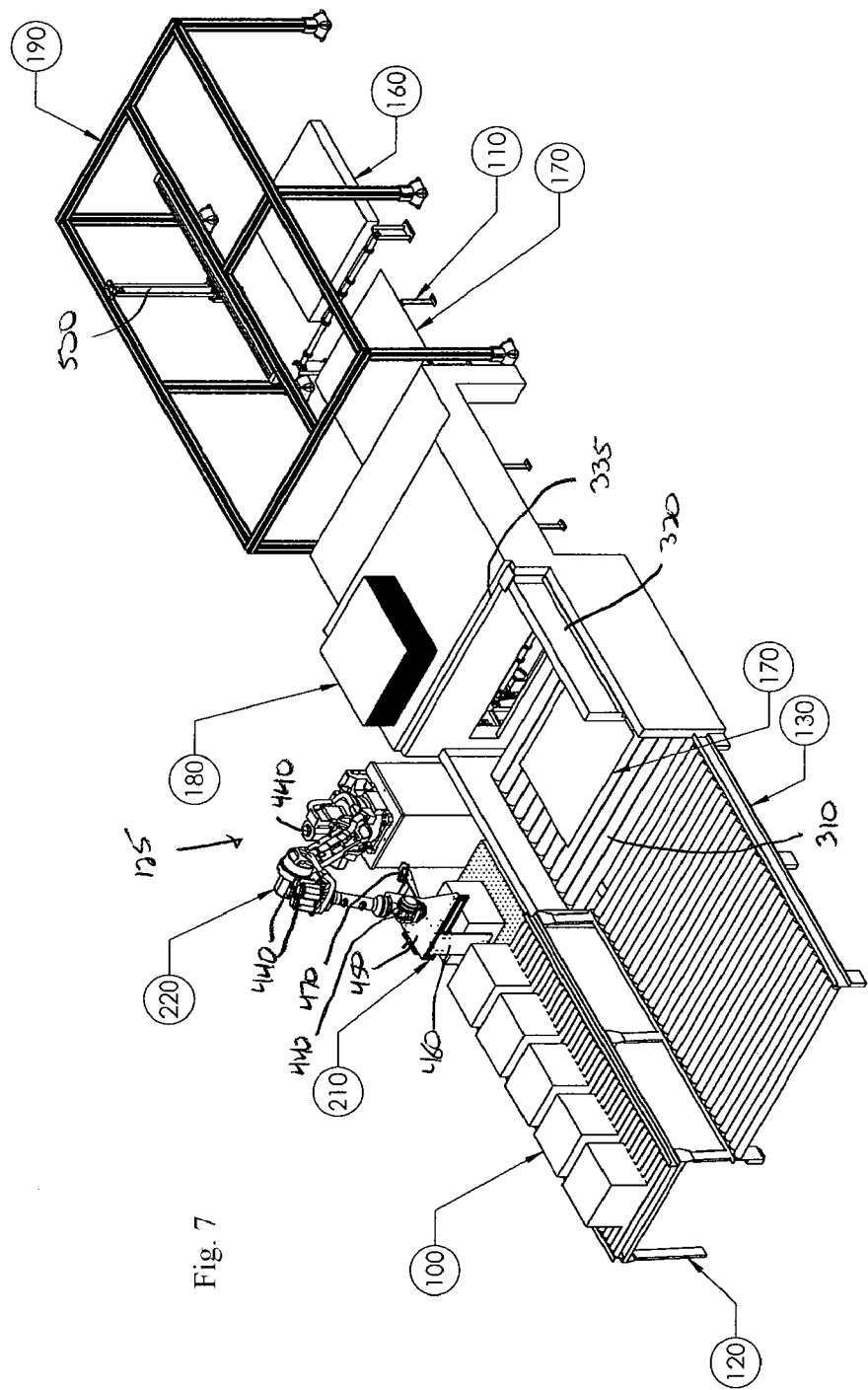
FIG. 7 is an isometric view of the device of FIG. 1 moving a pallet onto a loading conveyor.
Figure 8:
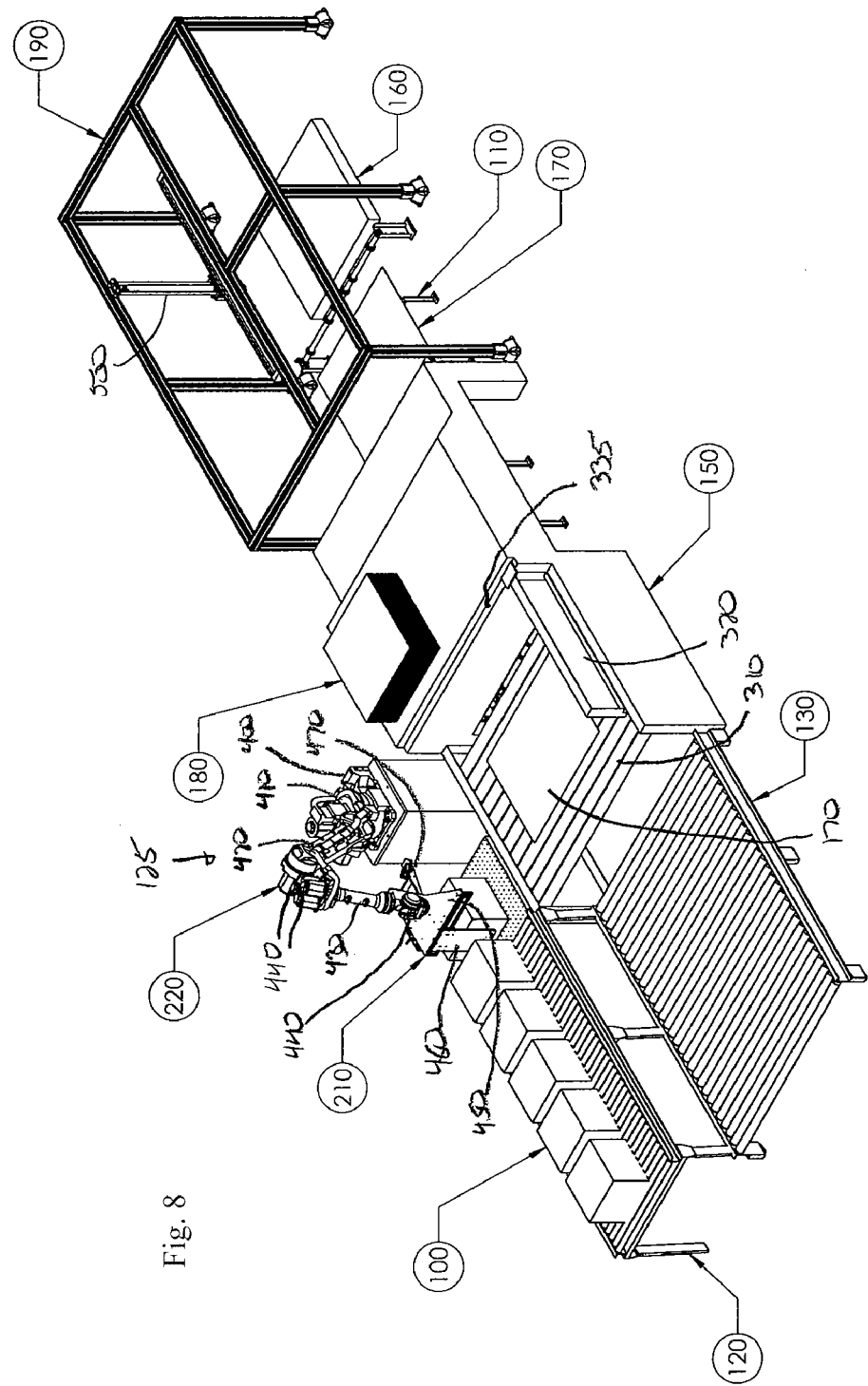
FIG. 8 is an isometric view of the device of FIG. 1 elevating the loading conveyor to a loading position.

Referring now to FIG. 5, in operation, initially the system 10 is configured with the conveyor section 310 in the upper position and the barrier 320 moved to a retracted position, generally opposite the feed conveyor 120. In FIG. 6, when the items 100 move toward the loading conveyor 150 along the feed conveyor 120, the robotic arm 220 is moved to position the manipulator 210 over the first item 100 on the conveyor 120. In FIG. 7, either subsequently or simultaneously with the movement of the manipulator 210 relative to the first item 100, the conveyor section 310 is lowered to the lower position, where the pallet 170 or similar object is moved from the stack 160 by a suitable device 500 onto the conveyor 110, which then discharges the pallet 170 onto the conveyor section 150. The conveyor section 310 and the pallet 170 are then elevated to the upper position aligned with the feed conveyor 120, as shown in FIG. 8.

Figure 9:
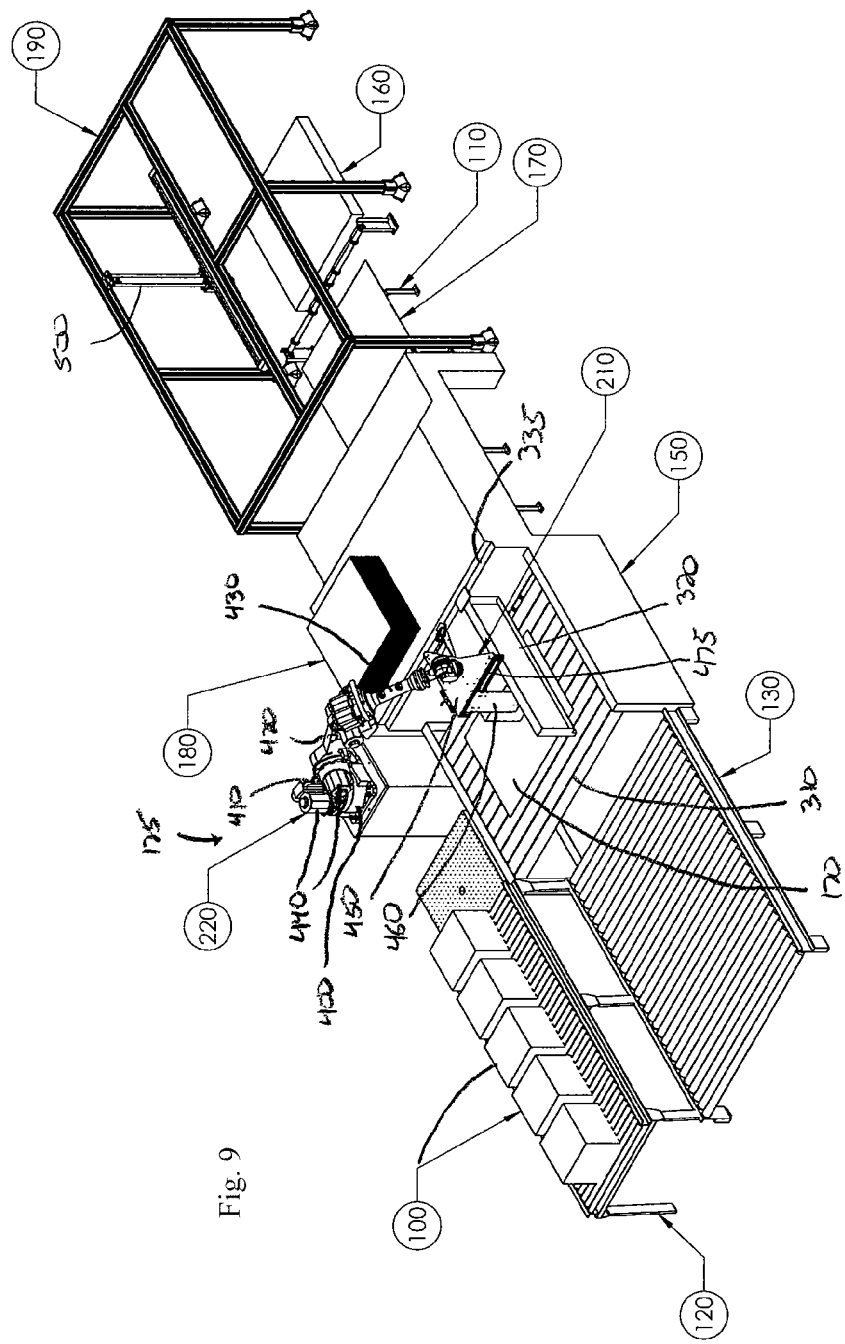
FIG. 9 is an isometric view of the device of FIG. 1 moving a barrier adjacent the pallet and an item onto the pallet.
Figure 10A:
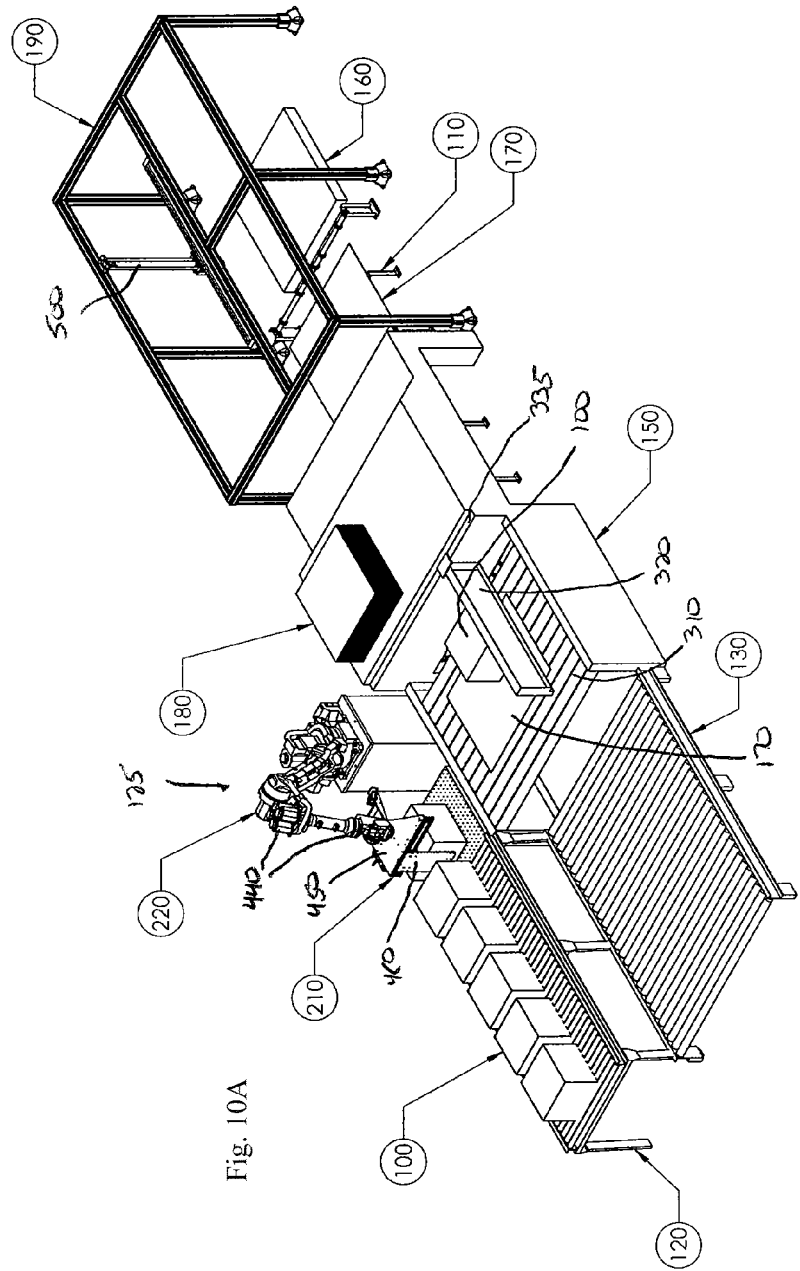
FIGS. 10A-10F are isometric views of the device of FIG. 1 moving additional items onto the pallet to form an item layer on the pallet.
Figure 10B:
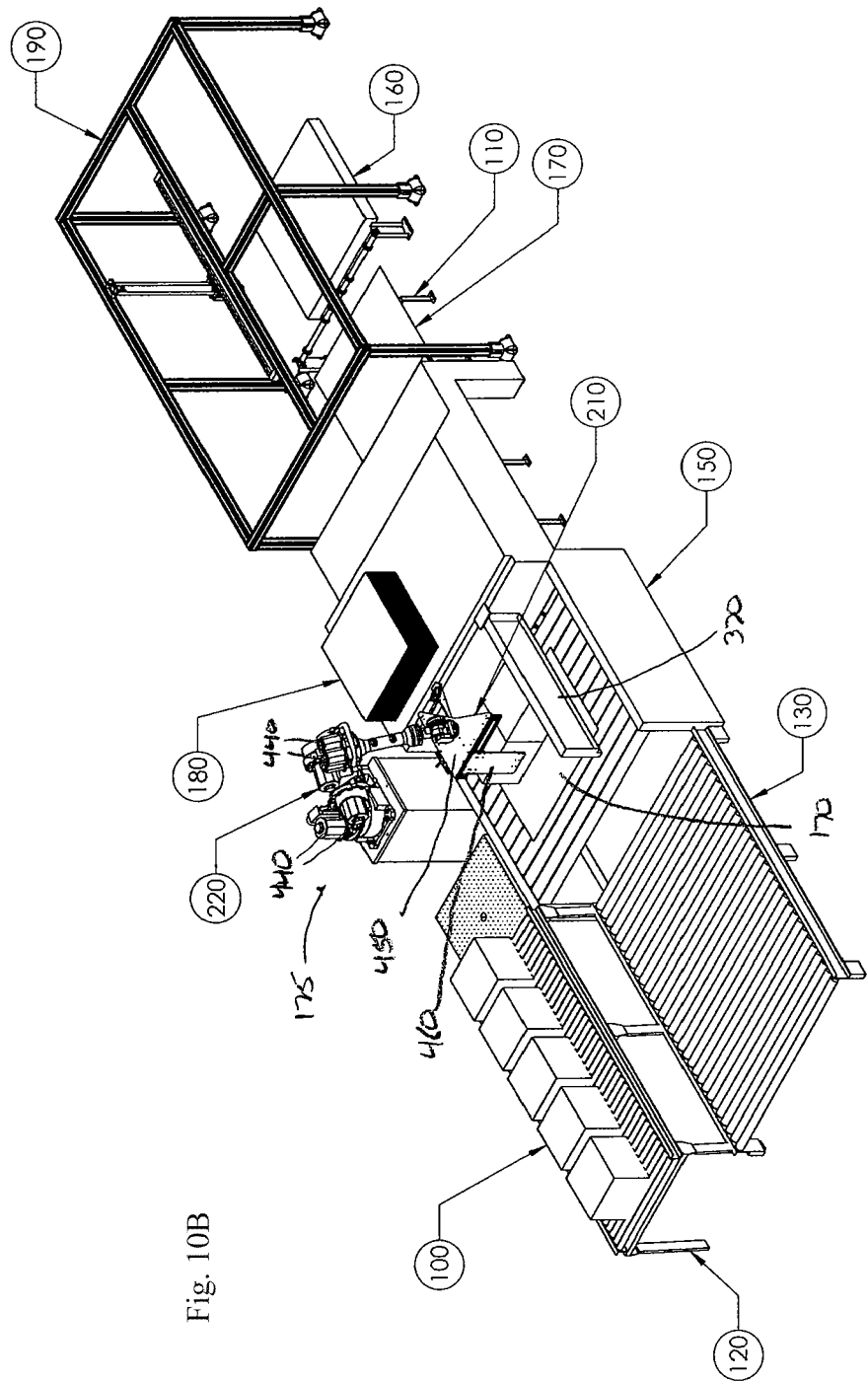
Figure 10C:
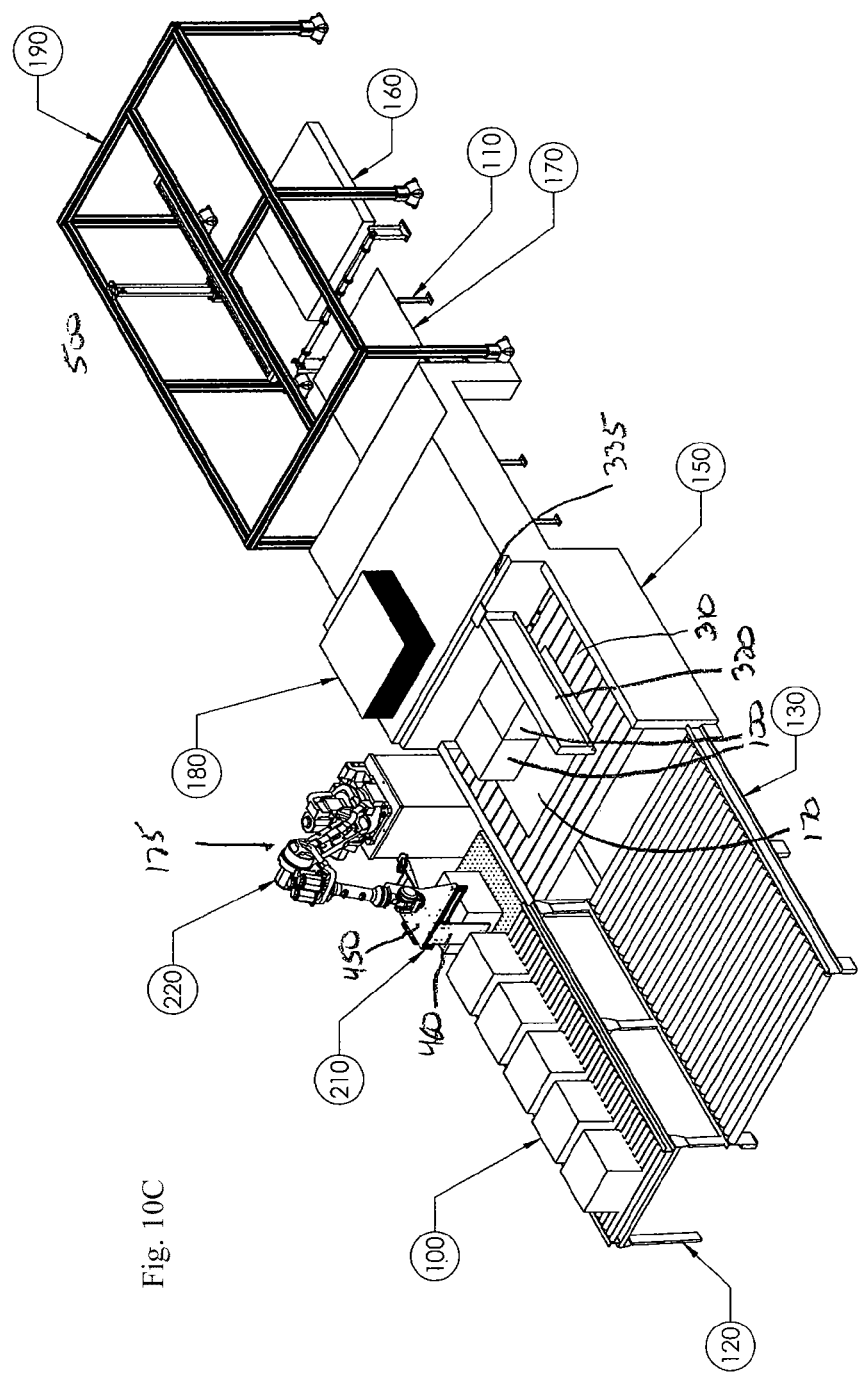
Figure 10D:
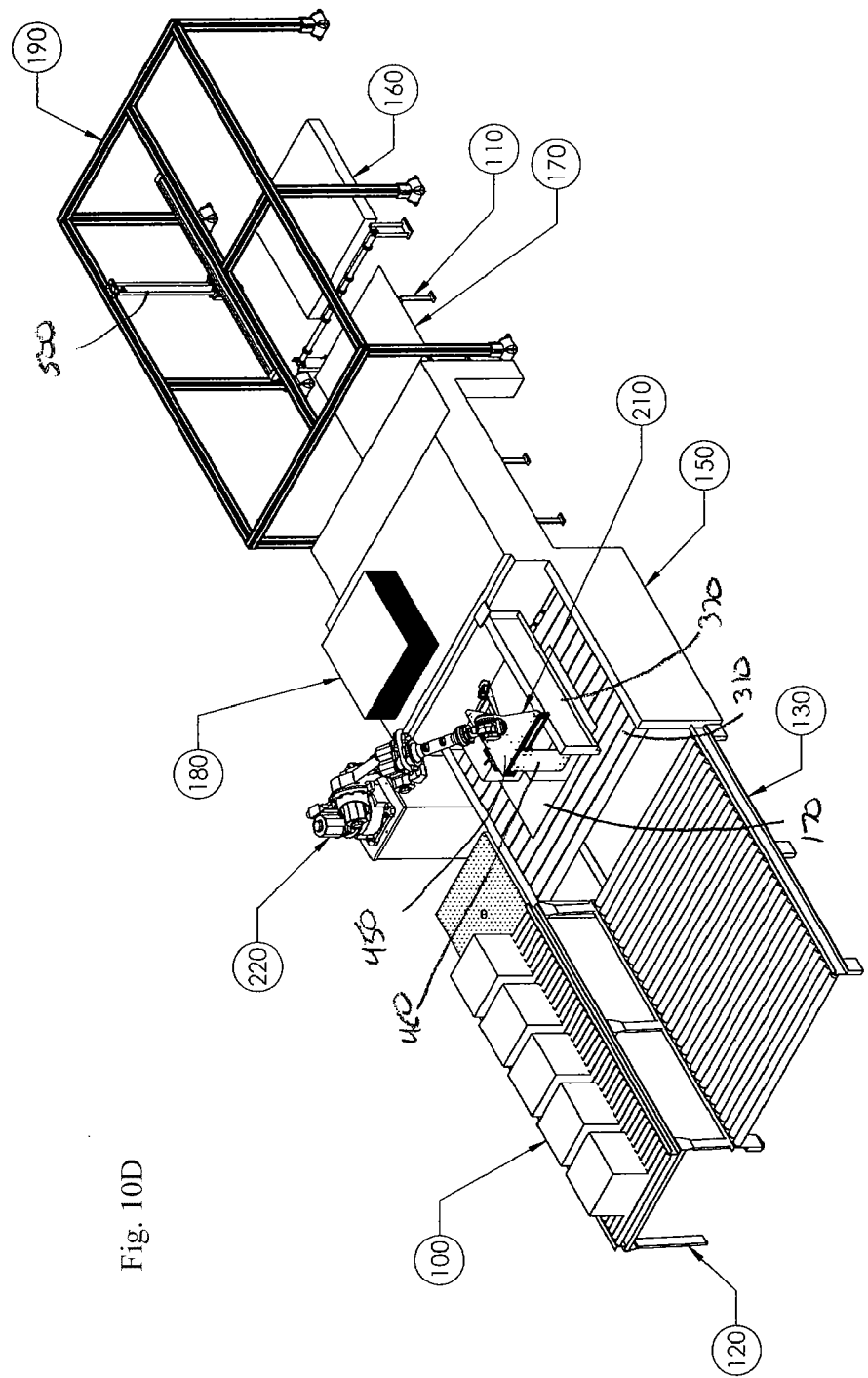
Figure 10E:
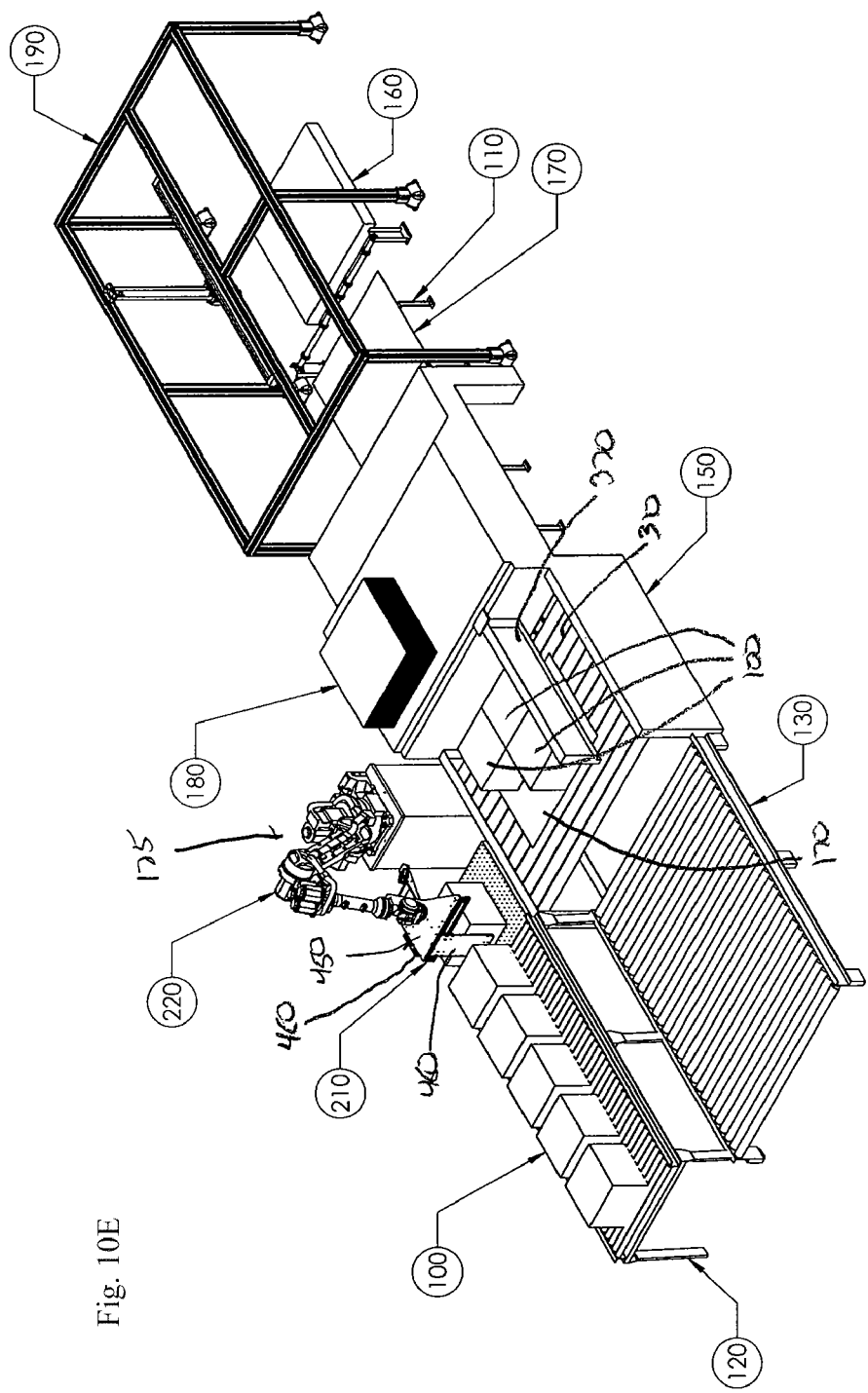
Figure 10F:
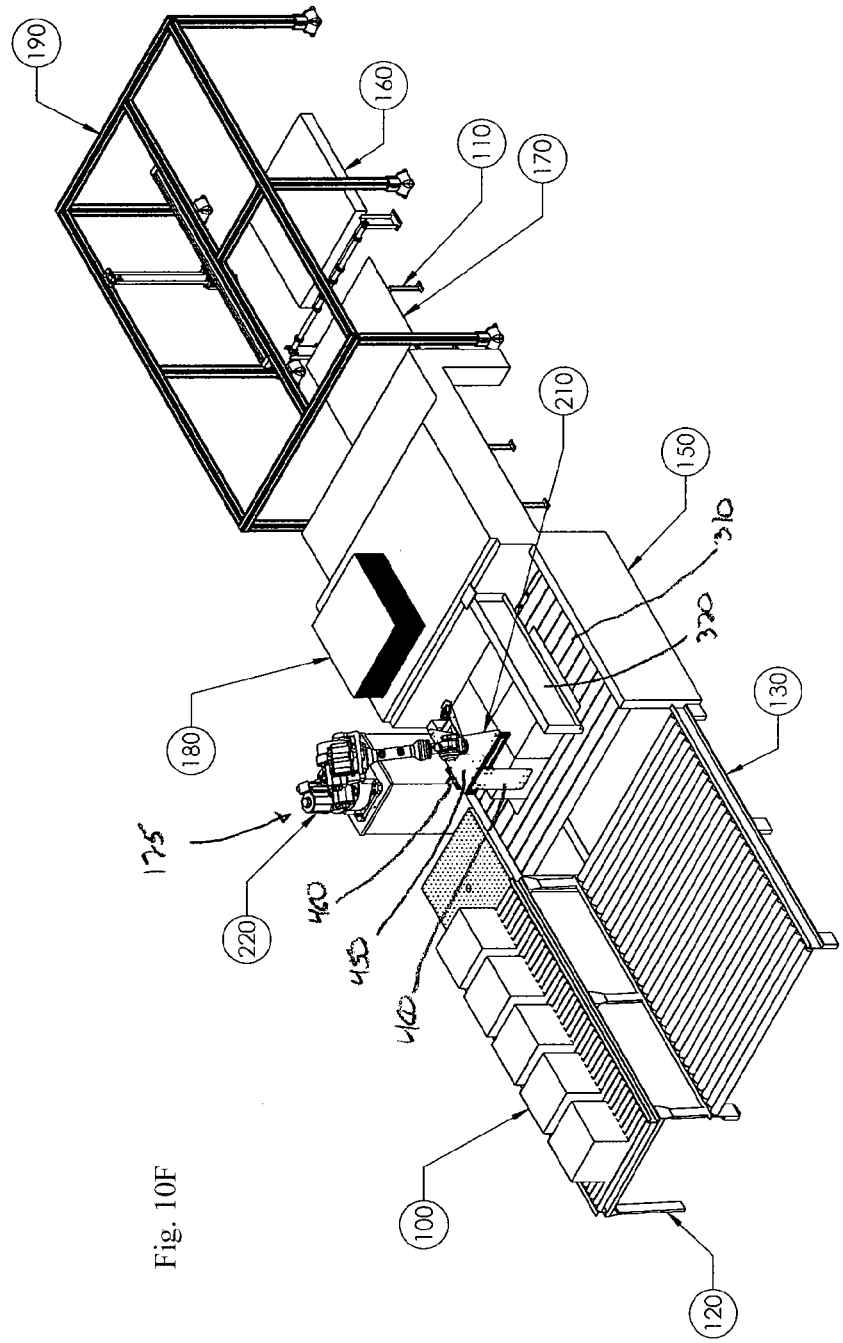

Looking now at FIG. 9, once the conveyer section 310 is in the upper position, the barrier 320 is moved along the track 325 in the frame 300 to the desired position, which is determined by the size of the pallet 170 disposed on the conveyor section 310. The barrier 320 essentially forms a back stop at the edge of the pallet 170, ensuring that the items 100 are properly positioned over the pallet 170 in the desired configuration.

The robotic arm 220 and the manipulator 210 are then operated by controlling the motors 440 as desired to move the arm 220 to engage the fingers 460 with the item 100. In engaging the item 100, the fingers 460 are positioned against the item 100 such that the lateral movement of the body 450 and fingers 460 of the manipulator 210 can consequently laterally move the item 100. From this position, the arm 220 and manipulator 210 are moved by the motors 440 to slide the item off of the feed conveyor 120 and onto the pallet 170 on the conveyor section 150. As the item 100 is slid by the motion of the arm 220, the manipulator 210 can simultaneously be rotated with respect to the distal portion 430 of the arm 220 in order to enable the fingers 460 to rotate the item 100 into the desired position for placement on the pallet 170. The movement of the manipulator 210 can shift the position of the item 100 throughout the entire 360° rotational capacity of the manipulator 210, such that the item 100 can be positioned as desired.

Further, in situations where the item 100 is formed of a stack of sheet of a material, the fingers 460 can additionally operate to stop the movement of the items 100 on the feed conveyor 120 and to align the sheets forming the item 100 into a vertical stack. Once aligned by the fingers 460 in this manner, the manipulator 210 can be moved from over the feed conveyor 120 to over the conveyor section 310 of the loading conveyor 150, while the fingers 460 operate to maintain the alignment of the item 100 so that no sheets from the stack are left behind when the stack is being moved.

Figure 11:
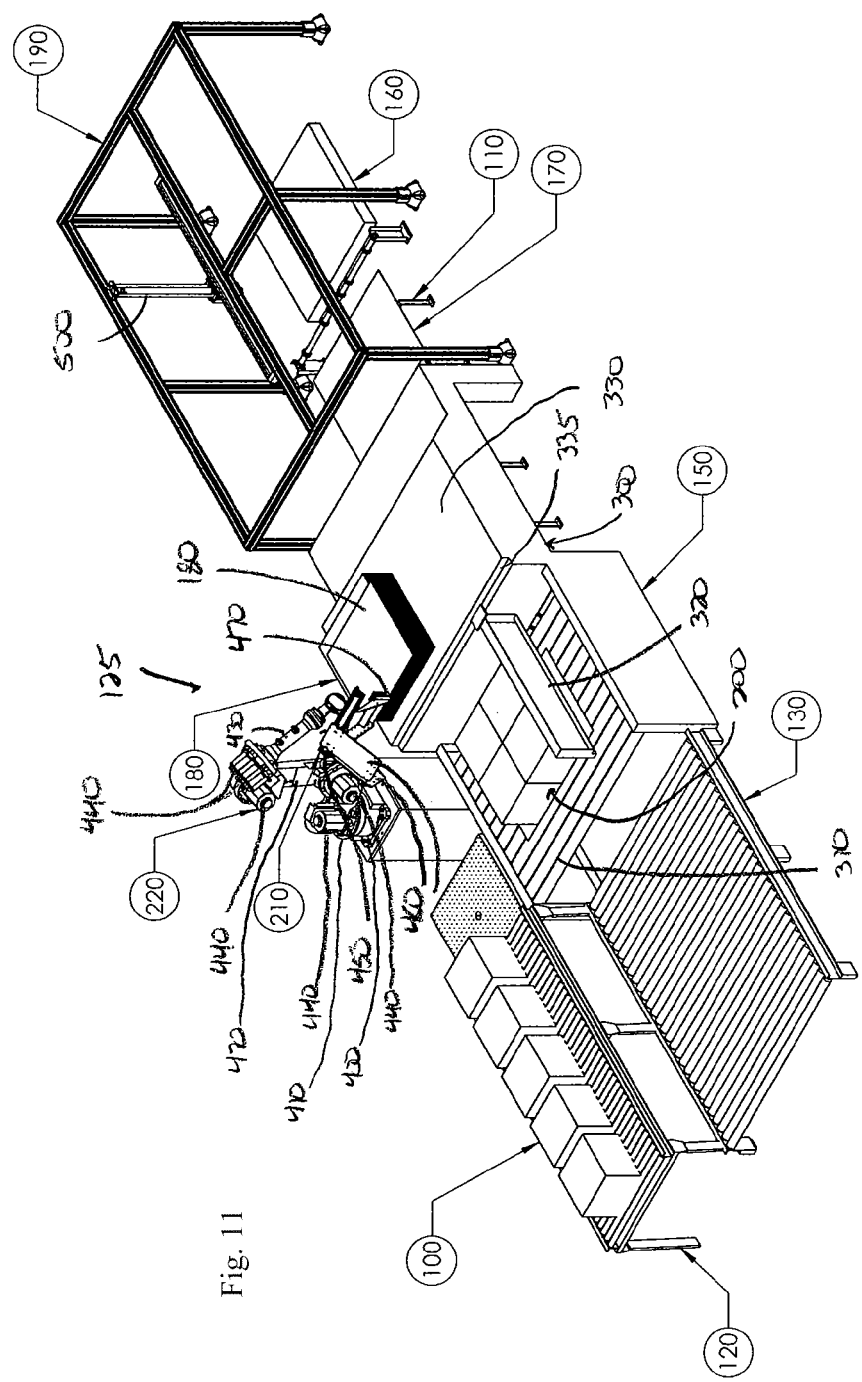
FIG. 11 is an isometric view of the manipulator of FIG. 1 grasping a separating sheet.
Figure 12:
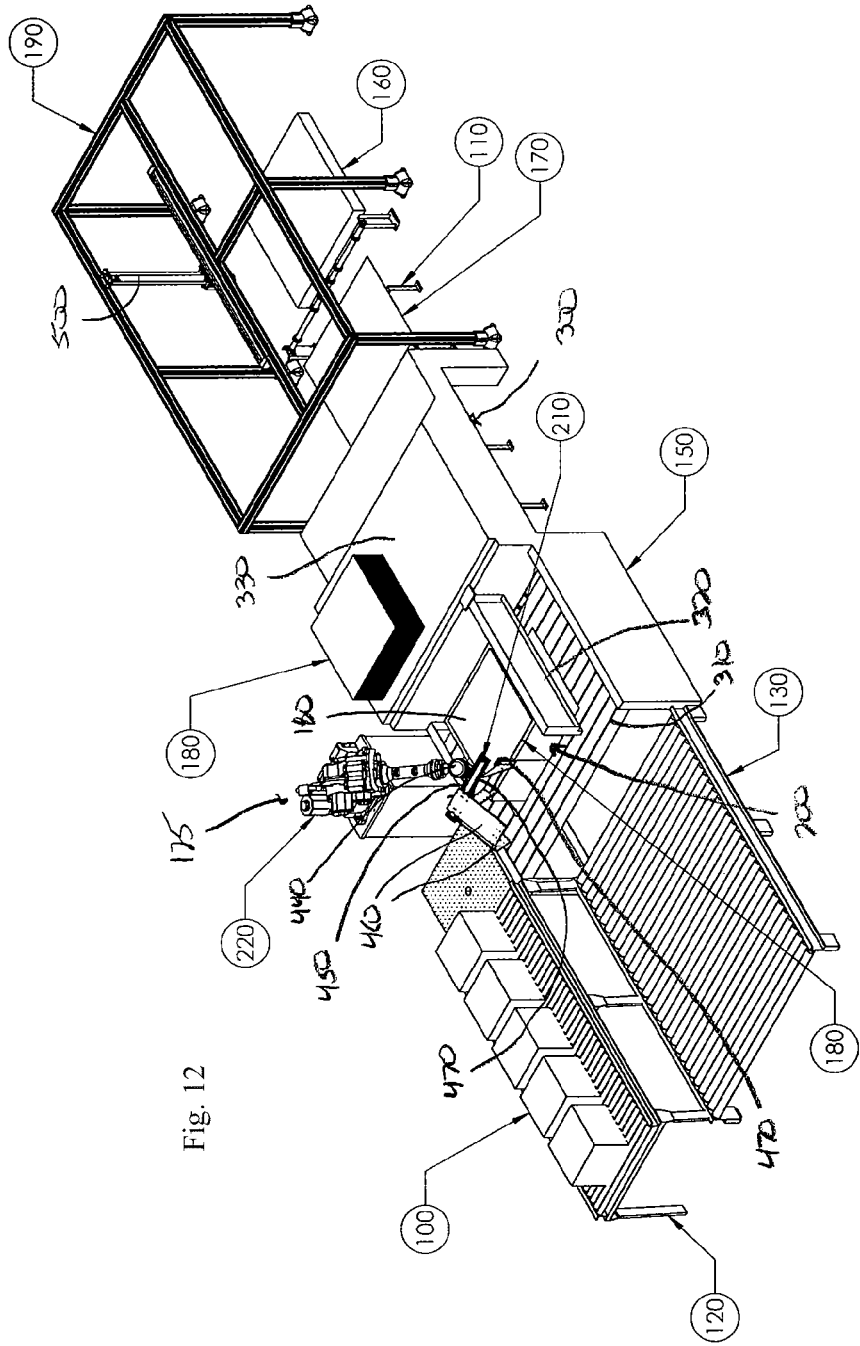
FIG. 12 is an isometric view of the device of FIG. 1 placing the separating sheet over the item layer.

Referring now to FIGS. 10A-10F, this process is shown being repeated in order to utilize the arm 220 and manipulator 210 to position a number of items 100 on the pallet 170 to form a first layer 500 on the pallet 170. Once the first layer 200 is complete, as shown in FIG. 11A, the arm 220 is moved to position a gripper 470 extending outwardly from the body 450 adjacent the stack of tie sheets 180. The gripper 470 can operate via the motor 440 on the body 450 in a conventional manner to grasp an individual tie sheet 180 and move the sheet 180 by movement of the arm 220 and manipulator 210 to a position on top of the first layer 200, as shown in FIG. 11B.

Figure 13A:
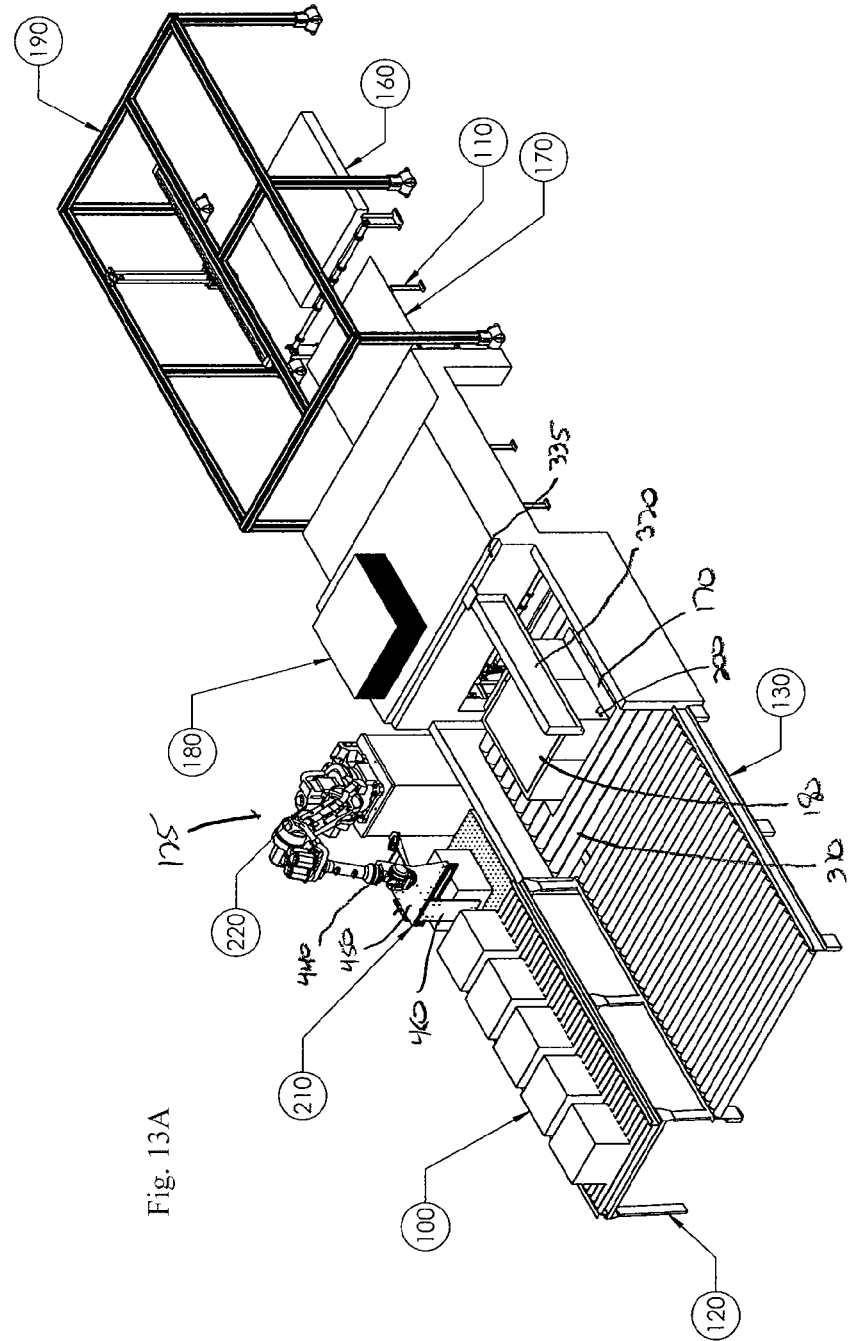
FIGS. 13A-13I are isometric views of the device of FIG. 1 lowering the loading conveyor to a secondary loading position and moving additional items onto the pallet to form another item layer on the pallet.
Figure 13B:
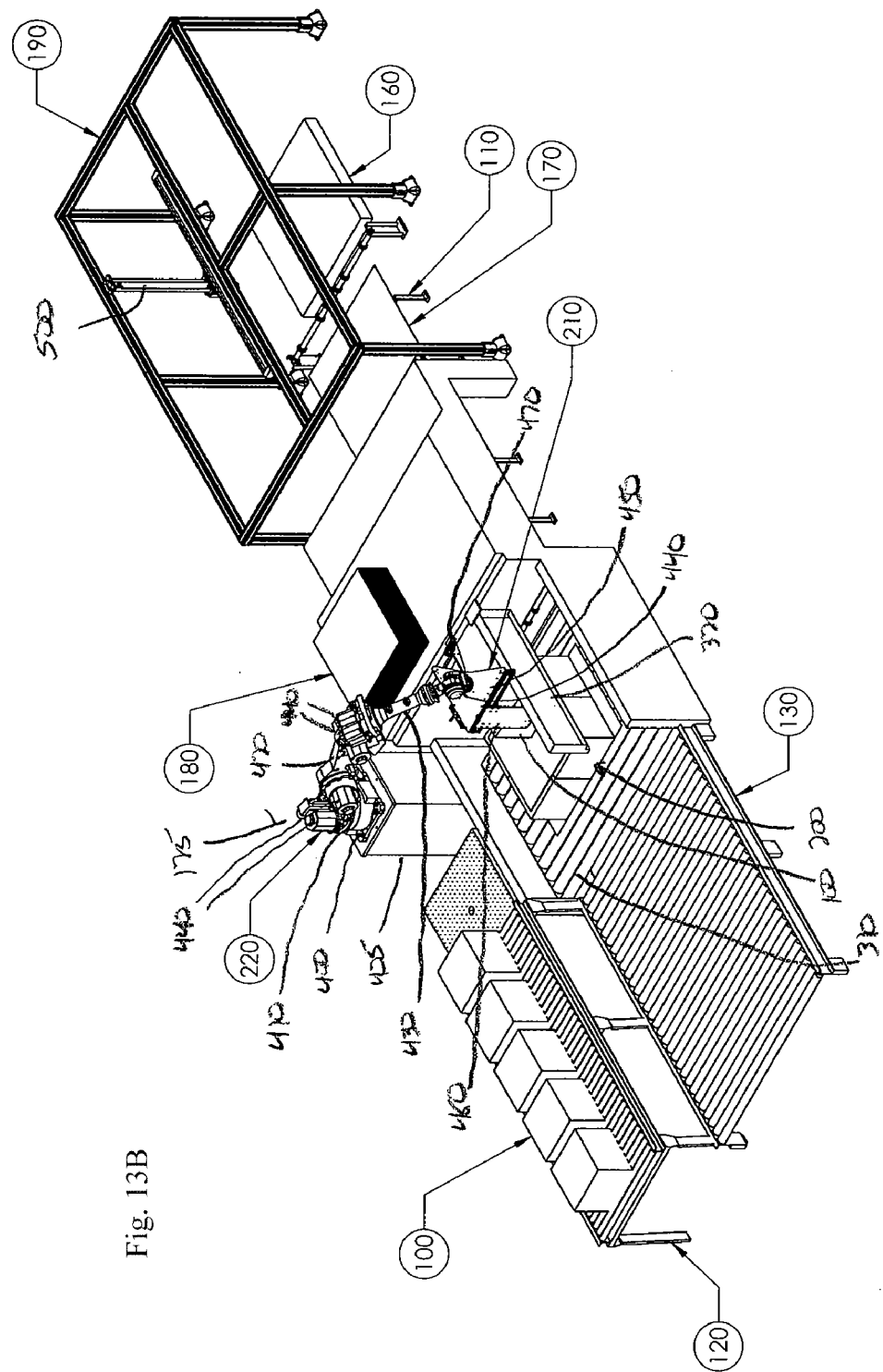
Figure 13C:
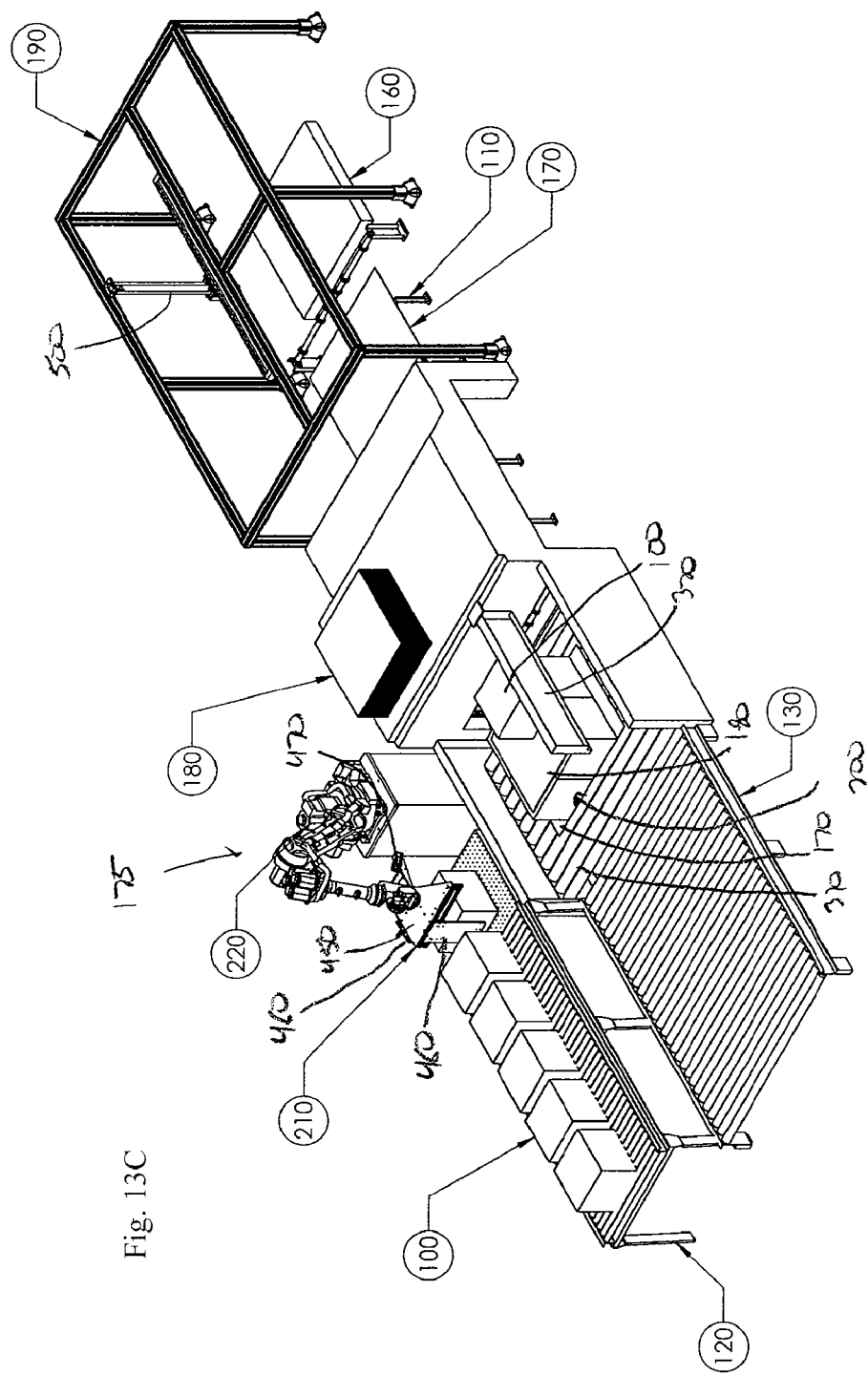
Figure 13D:
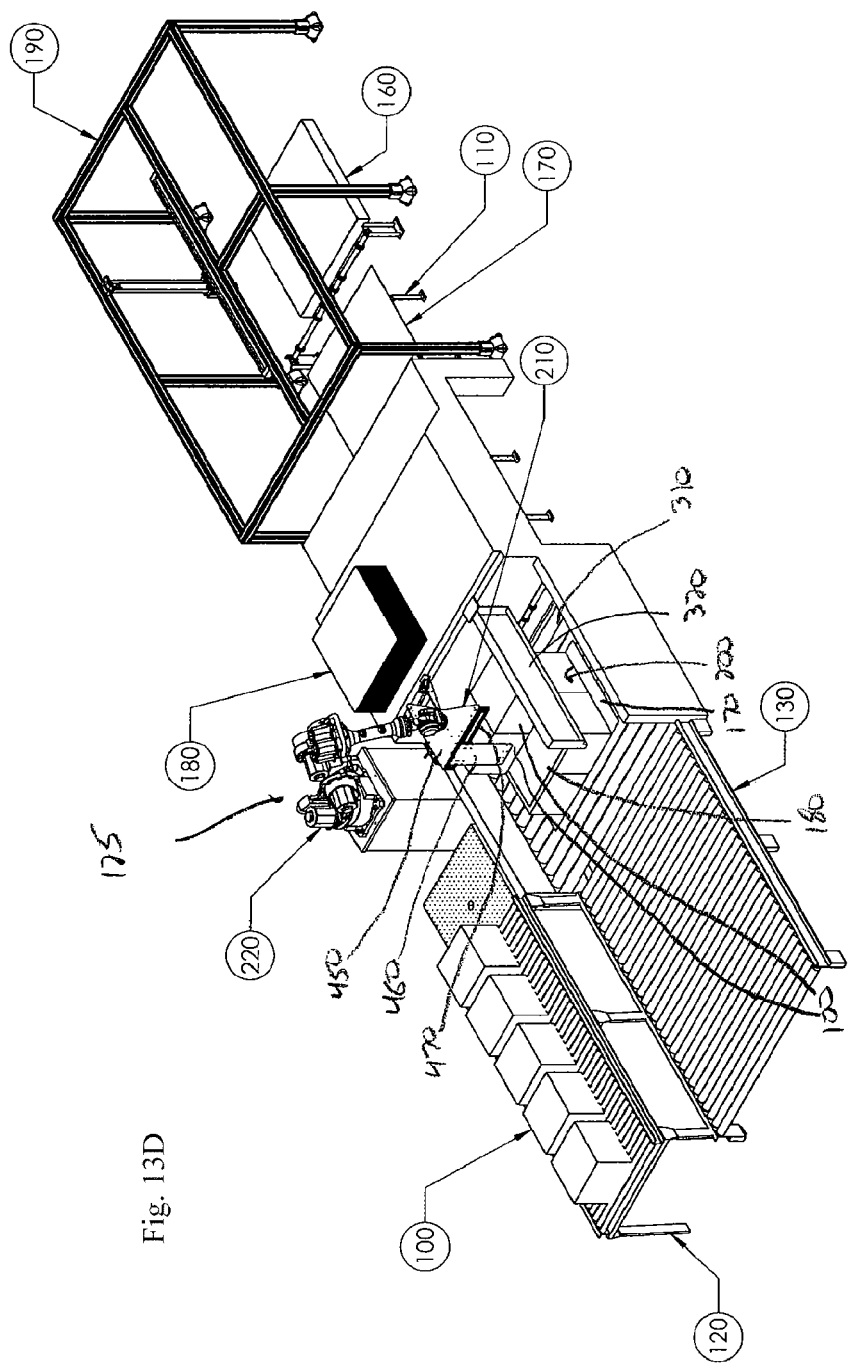
Figure 13E:
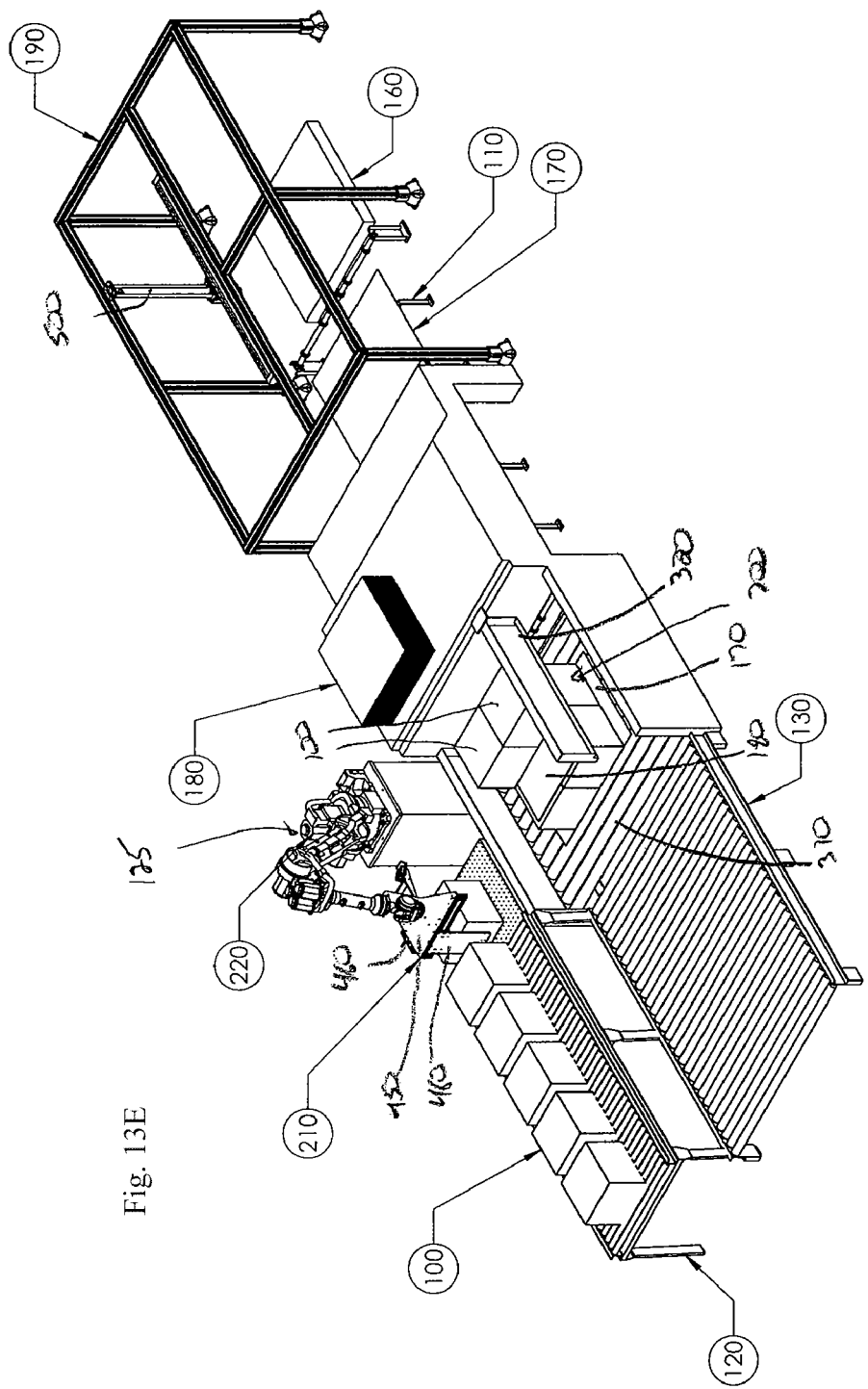
Figure 13F:
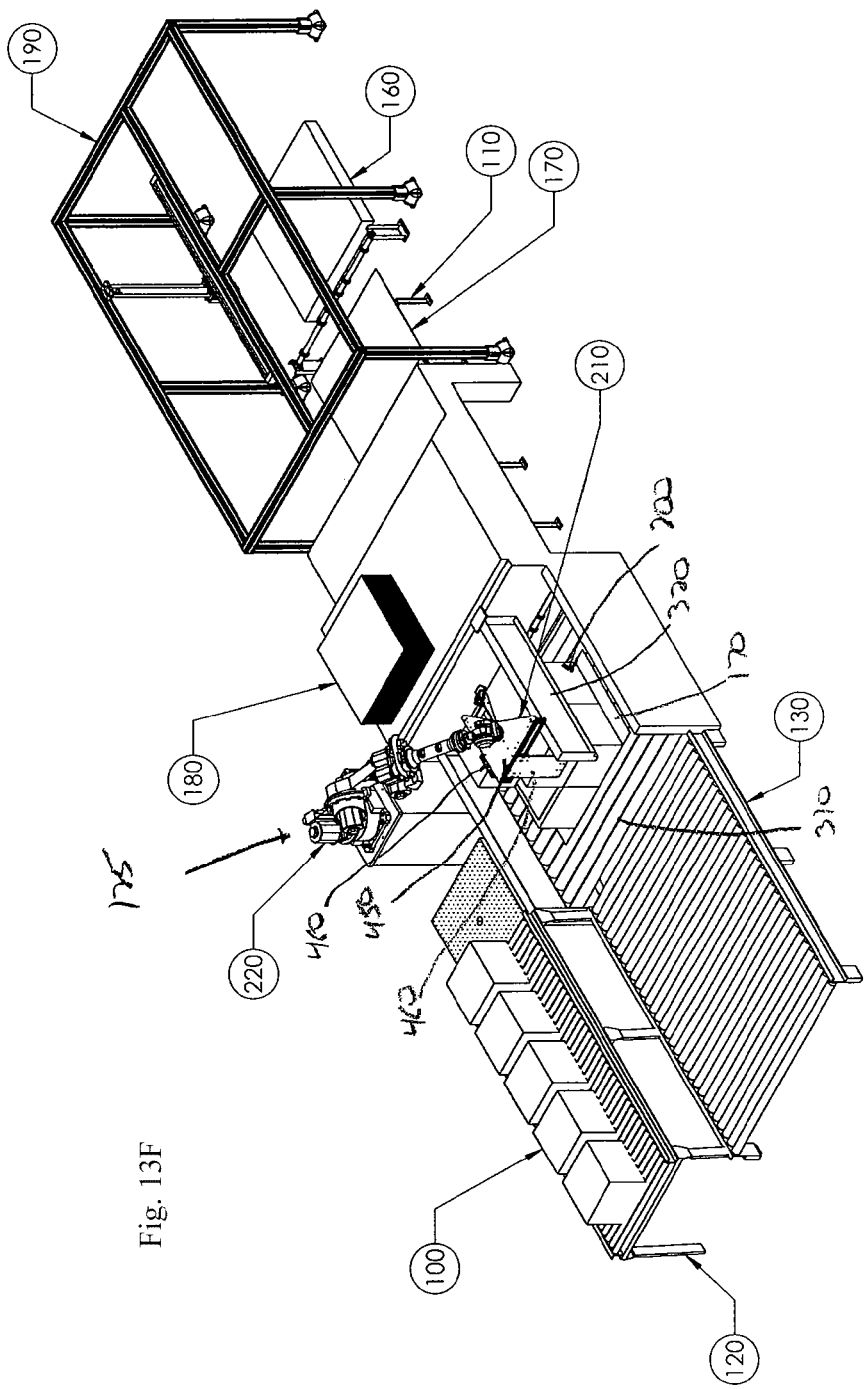
Figure 13G:
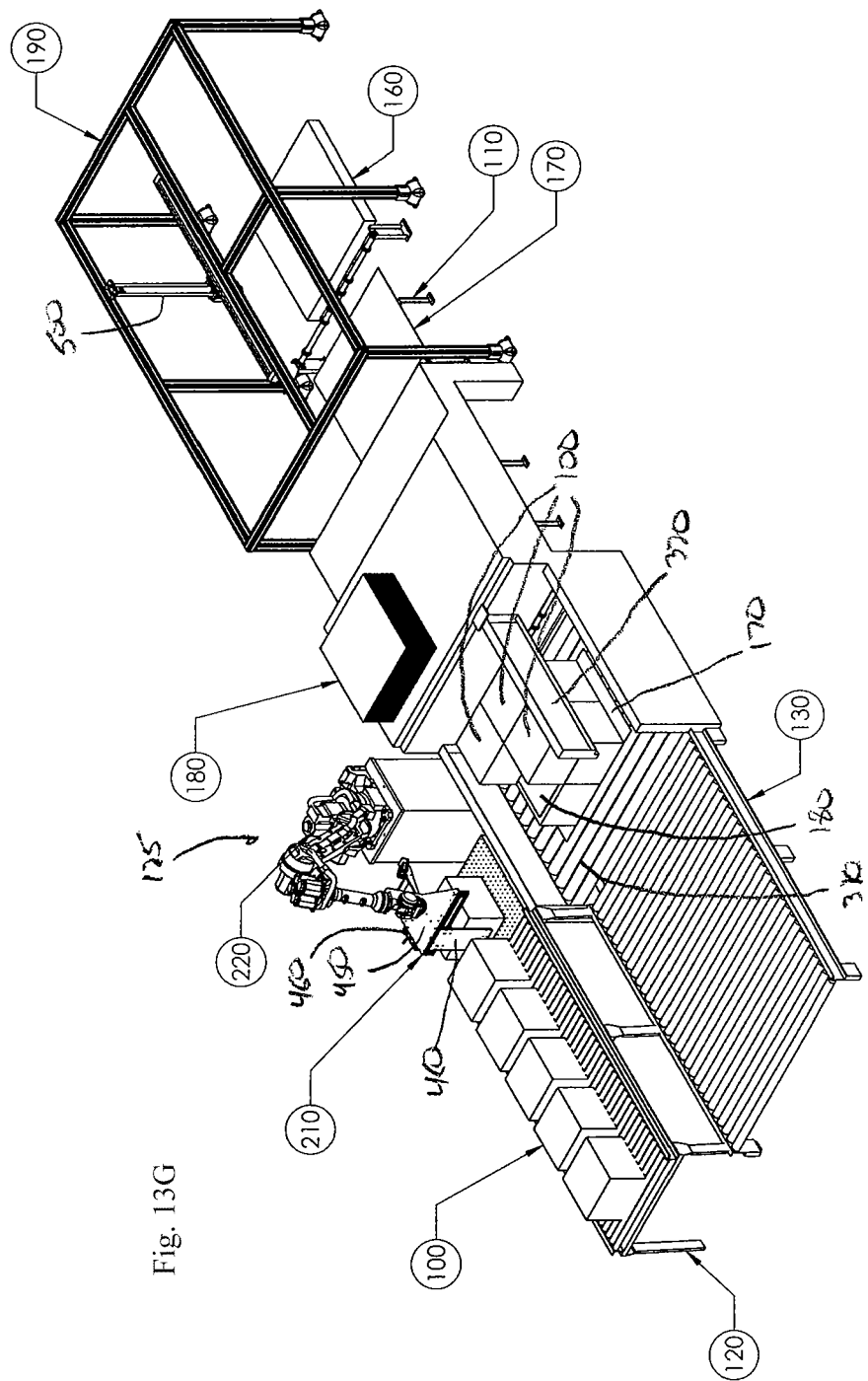
Figure 13H:
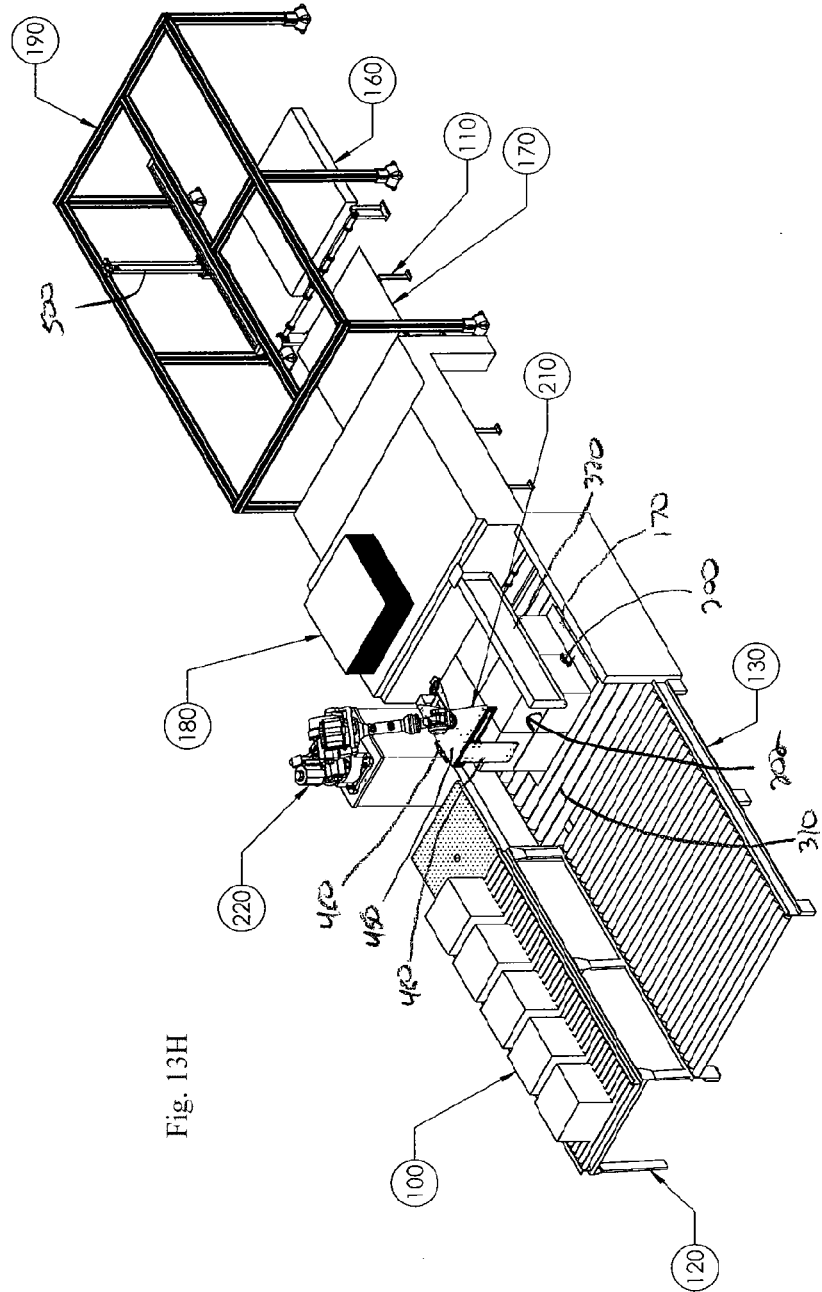
Figure 13I:
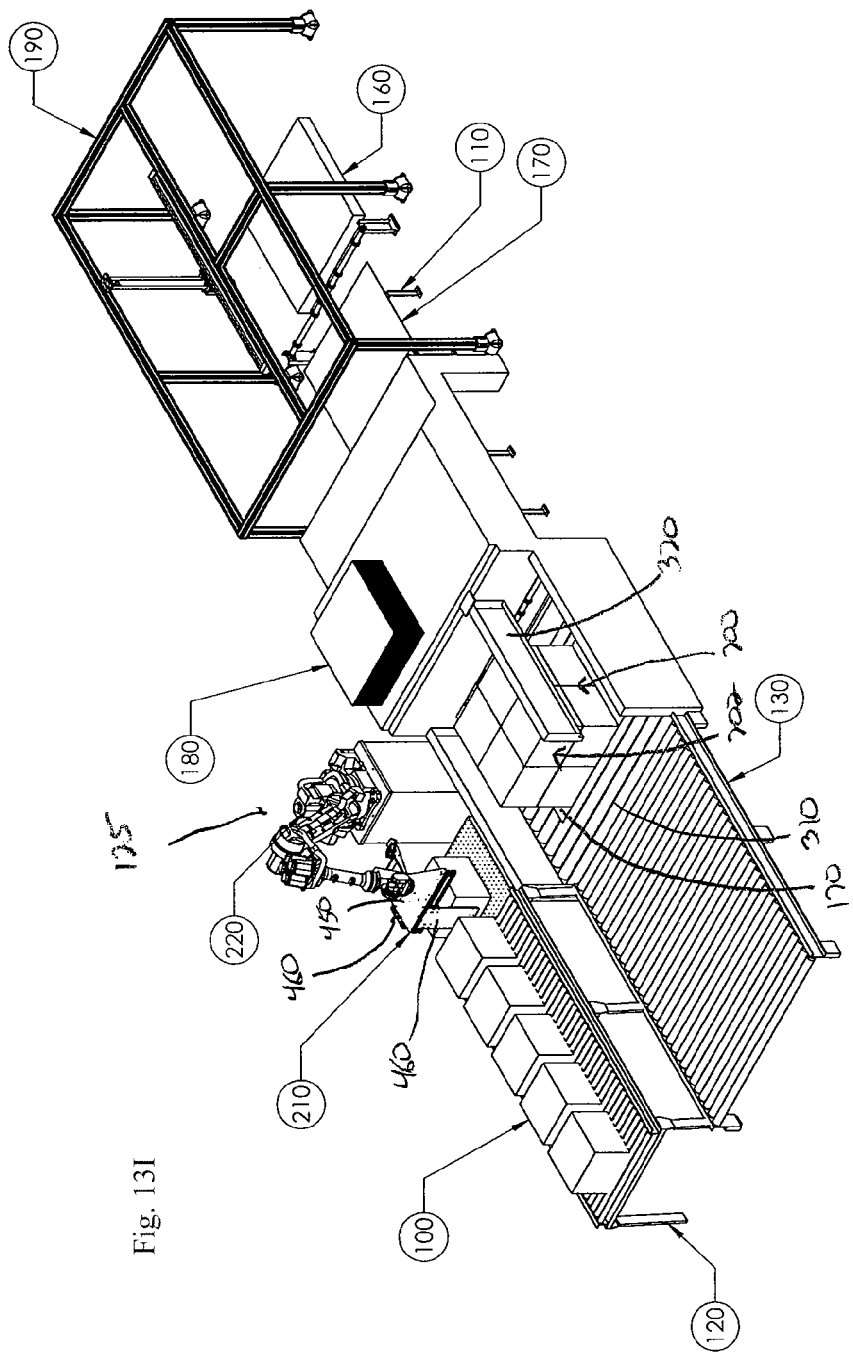

Once the tie sheet 180 has been placed on top of the first layer 200, the conveyor section 310 is lowered to position the tie sheet 180 at a position that is aligned with the feed conveyor 120, as shown in FIG. 13A. In this position, additional items 100 can be moved onto the tie sheet 180 over the first layer 200 by the arm 220 and manipulator 210 to form a second layer 202, as shown in FIGS. 13B-13I.

Figure 14:
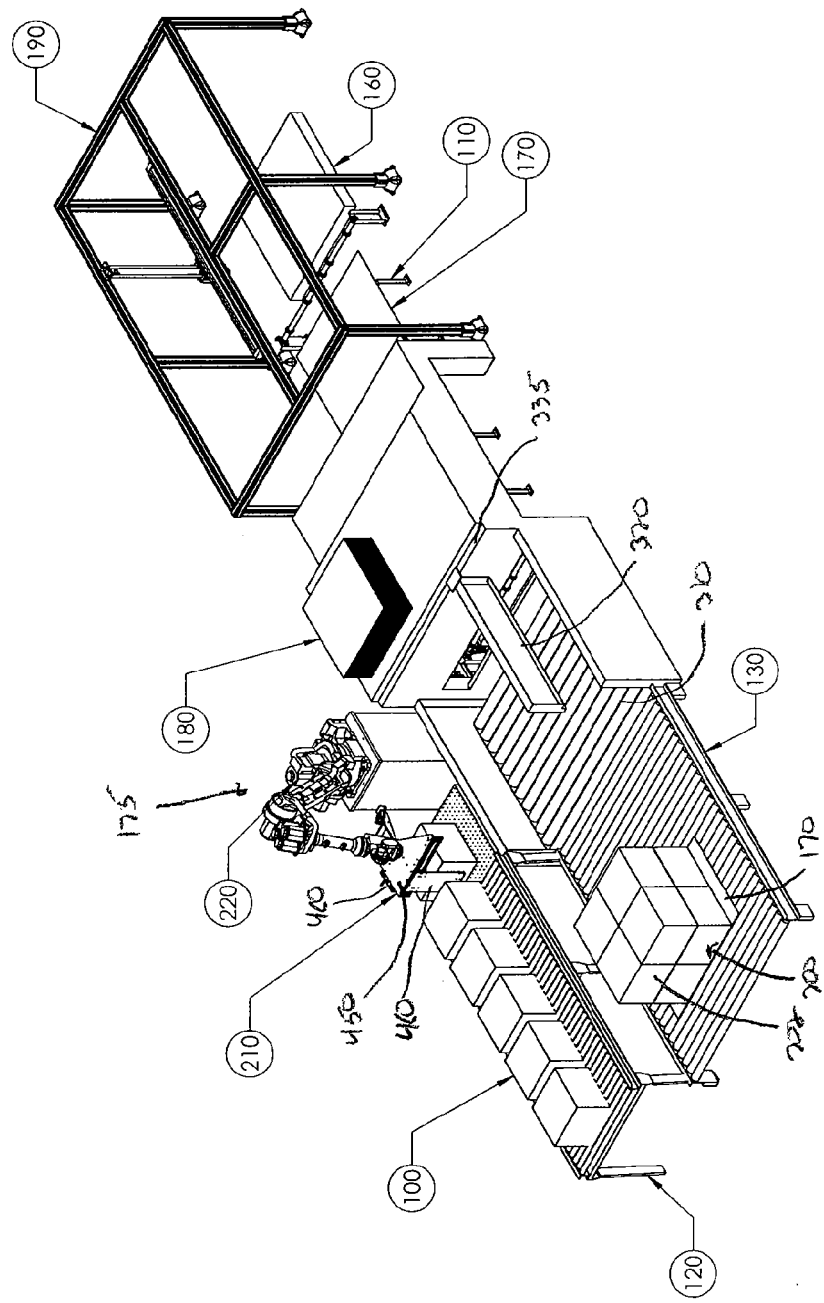
FIG. 14 is an isometric view of the device of FIG. 1 operating the loading conveyor to move the completed pallet.

Once completed, the pallet 170 including the first layer 200 and second layer 502 can be moved onto the outfeed conveyor 130 by operating the conveyor section 310, as shown in FIG. 14. At this point, a new pallet 170 can be discharged onto the conveyor section 310, and the process for forming new layers 200 and 202 thereon can be restarted.

The movement of the item 100 by the manipulator 210 off of the feed conveyor 120 and onto the conveyor section 310 of the loading conveyor 150 only slides the item 100 along the various surfaces of the conveyors 120 and 150, such that the design of the manipulator 210 can be simplified from prior art grippers required to lift the item(s) being moved. Further, the weight of the items 100 being moved also is less of an issue as a result of the lack of vertical movement of the item 100 caused by the arm 220 and manipulator 210.

Additionally, due to the positioning of the riser 405 and arm 220 to one side of the conveyors 120 and 150, in the situation where the arm 220 breaks down for some reason and is inoperable, the arm 220 can be moved away from the conveyors 120 and 150 to enable the operation of the loading conveyor 150 in a more conventional manner. This enables the arm 220 to be utilized with existing palletizing system without the need for making significant expenditures and/or alterations to the existing systems.

In other alternative embodiments of the invention, the operation of the arm 220 and the loading conveyor 150 are controlled by a central controller (not shown) which effectively synchronizes their operation to maximize the effectiveness of the overall system 10 including the arm 220 and the loading conveyor 150.

Also, one or more portions of the conveyors 120, 130 and 150 in the system 10 can be formed with breakaway parts (not shown) that function to enable the items 100 coming down the feed conveyor 120 to damage to the system 10.

Further, in addition to having the conveyor section 310 of the loading conveyor 150 be movable, the loading conveyor 150 can alternatively employ other suitable manners of positioning the assembled layers 200 directly on the pallet 170. For example, the loading conveyor 150 can employ a moveable platform (not shown) that extends outwardly from the frame 300 over the conveyor section 310 and is aligned with the feed conveyor 120. Once a layer 200 of the items 100 has been formed on the platform by the arm 220 and manipulator 210, the platform can be moved to enable the layer 200 to drop downwardly onto either the pallet 170 or onto a layer 200 already present on the pallet 170. Once the layer 200 is located on the pallet 170, the pallet 24 can be lowered by lowering the conveyor section 310, such that the platform can be repositioned over the pallet 170 and adjacent the feed conveyor 120 to enable a subsequent layer 202 to be formed for placement on the pallet 170.

Various other embodiments of the present disclosure are contemplated as being within the scope of the filed claims particularly pointing out and distinctly claiming the subject matter regarded as the invention.

The invention claimed is:

1. A palletizing system comprising:
  a) a feed conveyor;
  b) a loading conveyor;
  c) a robotic arm including a manipulator adapted to align and slide items from the feed conveyor to the loading conveyor wherein the manipulator includes a number of fingers positioned thereon and wherein the fingers are adjustably secured to the manipulator along a slot formed in the manipulator.

2. The palletizing system of claim 1 wherein the fingers are slidably secured along the slot.

3. A palletizing system comprising:
  a) a feed conveyor;
  b) a loading conveyor;
  c) a robotic arm including a manipulator adapted to align and slide items from the feed conveyor to the loading conveyor; and
  d) a movable barrier consisting of a single back stop disposed on the loading conveyor and laterally movable with respect to the lading conveyor.

4. The palletizing system of claim 3 wherein the single back stop is slidably movable over the loading conveyor along a track formed on the loading conveyor.

5. A palletizing system comprising:
  a) a feed conveyor;
  b) a loading conveyor;
  c) a robotic arm including a manipulator adapted to align and slide items from the feed conveyor to the loading conveyor, wherein the manipulator includes a number of fingers positioned thereon and a gripper spaced from the fingers.

6. The palletizing system of claim 5 wherein the loading conveyor is vertically movable with respect to the feed conveyor.

7. The palletizing system of claim 5 wherein the manipulator is further adapted to rotate the items.

8. The palletizing system of claim 5 wherein the fingers are adapted to align and maintain the alignment of a stack of sheets forming the item during movement of the manipulator.

9. The palletizing system of claim 5 wherein the manipulator laterally slides the items.

10. The palletizing system of claim 9 wherein the manipulator does not lift the items.

11. The palletizing system of claim 5 wherein robotic arm is mounted to a riser and removable from the palletizing system.

12. The palletizing system of claim 5 wherein the gripper is disposed on the manipulator at an angle with respect to the fingers, such that the manipulator is oriented in a first position when employing the fingers, and in a second position when employing the gripper.

13. A method of palletizing items in a desired configuration, the method comprising the steps of:
  a) providing the system of claim 5;
  b) moving a number of items to be palletized along the feed conveyor;
  c) engaging the items with the manipulator on the robotic arm; and
  d) sliding the items from the feed conveyor to the stacking section.

14. The method of claim 13 wherein the step of engaging the items further comprises aligning a stack of sheets forming the items.

15. The method of claim 13 wherein the step of sliding the items does not include lifting the items.

16. The method of claim 13 wherein the step of engaging the items comprises exclusively frictionally contacting the items.

* * * * *

UNITED STATES PATENT AND TRADEMARK OFFICE
CERTIFICATE OF CORRECTION

PATENT NO. : 9,126,770 B1  
APPLICATION NO. : 13/760878  
DATED : September 8, 2015  
INVENTOR(S) : Kevin Widder et al.

Page 1 of 1

It is certified that error appears in the above-identified patent and that said Letters Patent is hereby corrected as shown below:

IN THE CLAIMS

Claim 3, column 7, line 43, delete "lading" and substitute therefore -- loading --.

Signed and Sealed this
Ninth Day of February, 2016

Michelle K. Lee
*Director of the United States Patent and Trademark Office*